United States Patent
Sakuda et al.

(10) Patent No.: US 10,090,524 B2
(45) Date of Patent: Oct. 2, 2018

(54) LITHIUM TITANIUM SULFIDE, LITHIUM NIOBIUM SULFIDE, AND LITHIUM TITANIUM NIOBIUM SULFIDE

(71) Applicant: National Institute of Advanced Industrial Science and Technology, Tokyo (JP)

(72) Inventors: Atsushi Sakuda, Ikeda (JP); Tomonari Takeuchi, Ikeda (JP); Hikari Sakaebe, Ikeda (JP); Kuniaki Tatsumi, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 61 days.

(21) Appl. No.: 14/777,932

(22) PCT Filed: Mar. 17, 2014

(86) PCT No.: PCT/JP2014/057138
§ 371 (c)(1),
(2) Date: Sep. 17, 2015

(87) PCT Pub. No.: WO2014/148432
PCT Pub. Date: Sep. 25, 2014

(65) Prior Publication Data
US 2016/0285097 A1  Sep. 29, 2016

(30) Foreign Application Priority Data

Mar. 18, 2013 (JP) .................................. 2013-055213
Oct. 4, 2013 (JP) .................................. 2013-209209

(51) Int. Cl.
*H01M 4/58* (2010.01)
*H01M 10/0525* (2010.01)
(Continued)

(52) U.S. Cl.
CPC ........ *H01M 4/5815* (2013.01); *C01G 23/002* (2013.01); *C01G 33/006* (2013.01);
(Continued)

(58) Field of Classification Search
CPC ........... H01M 4/5815; H01M 10/0525; H01M 10/052; H01M 10/0569; H01M 2004/028;
(Continued)

(56) References Cited

U.S. PATENT DOCUMENTS

| 6,207,327 B1 | 3/2001 | Takada et al. |
| 6,228,516 B1 | 5/2001 | Denton, III |
| 6,824,920 B1 | 11/2004 | Iwamoto et al. |

FOREIGN PATENT DOCUMENTS

| CN | 102916186 | 2/2013 |
| JP | 02-204312 | 8/1990 |

(Continued)

OTHER PUBLICATIONS

Müller-Warmuth et al. Progress in intercalation research. vol. 17. Springer Science & Business Media, 2012.*

(Continued)

*Primary Examiner* — Stewart A Fraser
*Assistant Examiner* — Rachel L Zhang
(74) *Attorney, Agent, or Firm* — McCarter & English, LLP

(57) ABSTRACT

The present invention provides a novel lithium titanium sulfide, lithium niobium sulfide, or lithium titanium niobium sulfide that contains a sulfide containing lithium, titanium and/or niobium, and sulfur as constituent elements, and that has excellent charge-discharge performance (especially excellent charge-discharge capacity and charge-discharge potential) useful as a cathode active material or the like for lithium batteries, such as metal lithium secondary batteries or lithium-ion secondary batteries. Particularly preferred (Continued)

are, for example, (1) lithium titanium sulfide containing lithium, titanium, and sulfur as constituent elements and having a cubic rock salt crystal structure, (2) lithium niobium sulfide containing lithium, niobium, and sulfur as constituent elements and having a diffraction peak at a specific position in an X-ray diffractogram, and (3) lithium titanium niobium sulfide containing lithium, titanium, niobium, and sulfur as constituent elements and having a diffraction peak at a specific position in an X-ray diffractogram.

19 Claims, 21 Drawing Sheets

(51) Int. Cl.
| | | |
|---|---|---|
| *C01G 23/00* | (2006.01) | |
| *C01G 33/00* | (2006.01) | |
| *H01M 10/052* | (2010.01) | |
| *H01M 10/0569* | (2010.01) | |
| *H01M 4/02* | (2006.01) | |

(52) U.S. Cl.
CPC ..... *H01M 10/0525* (2013.01); *C01P 2002/72* (2013.01); *C01P 2004/61* (2013.01); *H01M 10/052* (2013.01); *H01M 10/0569* (2013.01); *H01M 2004/028* (2013.01); *Y02T 10/7011* (2013.01)

(58) Field of Classification Search
CPC . C01G 23/002; C01G 33/006; C01P 2002/72; C01P 2004/61; Y02T 10/7011
See application file for complete search history.

(56) References Cited

FOREIGN PATENT DOCUMENTS

| JP | 11-297359 | 10/1999 |
|---|---|---|
| JP | 200017589 A | 6/2000 |
| JP | 2003502265 A | 1/2003 |
| JP | 2004152659 A | 5/2004 |
| JP | 2004522674 A | 7/2004 |
| JP | 62-260719 | 11/2009 |
| WO | WO-0078673 A1 | 12/2000 |
| WO | WO-2002046102 | 6/2002 |

OTHER PUBLICATIONS

Clerc et al. "Periodic Hartree—Fock Study of Li x TiS2, 0≤ x≤ 1: The Structural, Elastic, and Electronic Effects of Lithium Intercalation in TiS2." The Journal of Physical Chemistry A 101.47 (1997): 8926-8931.*
Benco et al., "First Principles Calculation of Electrode Material for Lithium Intercalcation Batteries: $TiS_2$ and $LiTi_2S_4$ Cubic Spinal Structures", Journal of Solid State Chemistry, 1999, vol. 145, pp. 503-510.
Murphy, "Insertion Reactions in Electrode Materials", Solid State Ionics, 1986, vol. 18 & 19, pp. 847-851.
Yamamoto et al., "Lithium Secondary Battery Using Monoclinic $NbS_3$ Prepared under High Pressure", J. Electrochem. Soc., 1986, Vo.. 133, No. 8, pp. 1558-1561.
Sinha et al., "Lithium Interalcation in Cubic $TiS_2$", Solid State Ionics, 1986, vol. 20, pp. 81-84.
Küchler et al., "Li NMR Relaxation by Diffusion in Hexagonal and Cubic Lic $TiS_2$", Solid State Ionics, 1994, vol. 70 & 71, pp. 434-438.
Whittingham, "The Role of Ternary Phase in Cathode Reactions", Journal of the Electrochemical Society, 1976, vol. 123, No. 3, pp. 315-320.
Lindic et al., "XPS Investigations of $TiO_yS_z$ Amorphous Thin Films Used as Positive Electrode in Lithium Microbatteries", 2005, Solid State Ionics, vol. 176, pp. 1529-1537.
Kumagai et al., "Charge-Discharge Characteristics and Structural Change in Various Niobium Sulfide Cathodes for Lithium-Nonaqueous Secondary Batteries", 1982, Electrochimica Acta, vol. 27, No. 8, pp. 1087-1092.
Whittingham, "Chemistry of Intercalation Compounds: Metal Guests in Chalcogenide Hosts", Progress in Solid State Chemistry, 1978, vol. 12, pp. 41-99.
Chianelli et al., "Reaction of n-Butyllithium with Transition Metal Trichalcogenides", 1975, Inorganic Chemistry, vol. 14, No. 10, pp. 2417-2421.
International Search Report based on co-pending International Application No. PCT/JP2014/057138, dated Jun. 10, 2014.
Supplemental European Search Report based on copending European Application No. 14768714.9, dated Sep. 26, 2016—9 Pages.
Sakhda, Atsushi, et al., "Rock-Salt-Type Lithium Metal Sulphides as Novel Positive-Electrode Materials", Scientific Reports, May 8, 2014, pp. 1-5.

* cited by examiner

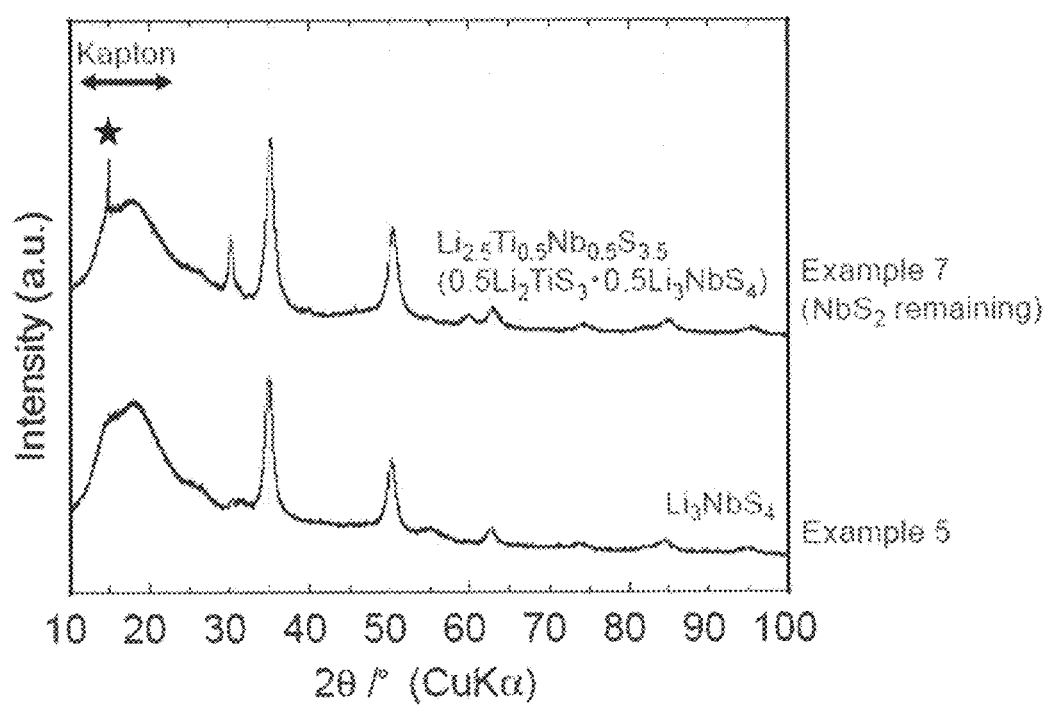

LITHIUM TITANIUM SULFIDE, LITHIUM NIOBIUM SULFIDE, AND LITHIUM TITANIUM NIOBIUM SULFIDE

CROSS-REFERENCE TO RELATED APPLICATIONS

This application is a national stage application filed under 35 USC 371 of PCT/JP2014/057138, filed Mar. 17, 2014, which claims the benefit of Japanese Patent Application Nos. 2013-209209, filed Oct. 4, 2013 and 2013-055213, filed Mar. 18, 2013, all of which are incorporated herein, in entirety, by reference.

TECHNICAL FIELD

The present invention relates to lithium titanium sulfide, lithium niobium sulfide, and lithium titanium niobium sulfide, as well as methods for producing the sulfides, and to lithium batteries using the sulfides.

BACKGROUND ART

Since portable electronic devices, hybrid vehicles, etc., have had higher performance in recent years, secondary batteries (particularly lithium-ion secondary batteries) used for such devices are increasingly required to have higher capacity. However, for current lithium-ion secondary batteries, the development of higher-capacity cathodes lags behind the development of higher-capacity anodes. Even lithium nickel oxide-based materials, which are said to have a relatively high capacity, have a capacity of only about 190 to 220 mAh/g.

Metal sulfides have relatively high theoretical capacities. Among titanium sulfides that are known as electrode materials for lithium secondary batteries, $TiS_2$ and $TiS_3$ have been reported to have a discharge capacity of about 240 mAh/g and about 350 mAh/g, respectively (NPL 1 and 2).

Among metal sulfides, not only titanium sulfides but also niobium sulfides have been reported to be used as cathode materials. For example, $NbS_2$ has been reported to be capable of reversibly charging and discharging for an approximately one-electron reaction per composition formula (NPL 3 and 4). This capacity corresponds to a charge-discharge capacity of about 170 mAh/g per weight of $NbS_2$. $NbS_3$ also has been reported to be capable of reversibly charging and discharging for a two-electron reaction at a voltage of approximately 2 V (NPL 3 and 5). This capacity corresponds to a charge-discharge capacity of about 300 mAh/g per weight of $NbS_3$. Further, these niobium sulfides can reversibly charge and discharge even at low voltage levels and also provide a larger capacity (a three-electron reaction, about 450 mAh/g), but the average discharge potential decreases. In addition, there is a report that $NbS_3$ had poor reversibility and significantly deteriorated. Furthermore, the capacity actually measured was not as high as the reported value and not considered to be sufficient.

Such titanium sulfides and niobium sulfides, however, contain no lithium. Therefore, to produce a lithium-ion secondary battery, it is necessary to use a lithium-containing material as an anode to start charge and discharge from discharge. This requires a lithium-containing anode material. However, there have been only a few reports on lithium-containing anode materials for practical use.

Accordingly, using a lithium-containing material as a cathode active material is desirable. The development of a lithium-containing cathode active material capable of high-capacity charge and discharge has been desired.

As lithium-containing titanium sulfides, $Li_xTiS_2$ (0≤x≤1), $Li_xTiS_3$ (0≤x≤3), etc., have been reported as discharge products of $TiS_2$ and $TiS_3$, which are crystals that have a layered structure (NPL 1 and 6). When a large amount of lithium is intercalated into such titanium sulfides, the layered structure becomes unstable and the original structure cannot be maintained. Therefore, more than a certain amount of lithium cannot be intercalated or removed. Accordingly, to obtain a higher capacity, there is a need to develop a material that has a non-layered crystal structure.

For example, materials with a cubic crystal spinel structure have been reported as three-dimensional structures. With respect to $TiS_2$, chemical or electrochemical intercalation of lithium into $TiS_2$ having a cubic crystal spinel structure has been reported to produce a cubic lithium titanium sulfide (NPL 7). Specifically, NPL 7 reports that when lithium is chemically intercalated into $TiS_{2.05}$ having a cubic crystal spinel structure by using normal butyl lithium, $Li_xTi_{2.05}S_4$ (0≤x≤1.95) is obtained, and that when lithium is electrochemically intercalated by using an electrochemical cell, a spinel lithium, titanium sulfide of $Li_xTi_{2.05}S_4$ (wherein 0≤x≤1.8) is obtained. It can be understood from these reports that intercalation of lithium into spinel $TiS_2$ can produce lithium titanium sulfide of a spinel structure, which is represented by $Li_xTi_2S_4$ wherein x is less than 2.

In the spinel structure, however, the number of sites that may be occupied by lithium ions is approximately the same as that of transition metals. Accordingly, even if all the lithium is involved in charge and discharge, the maximum capacity is 225 mAh/g. For a higher capacity, the development of a material, such as a material having a rock salt crystal structure, which can be expected to have a higher lithium content per weight, has been desired. However, there is no report on the development of such a material.

Further, there are only a few reports on lithium-containing niobium sulfide. In particular, there is no report about high-capacity lithium-containing niobium sulfides.

CITATION LIST

NPL

NPL 1: M. S. Whittingham, J. Electrochem. Soc., 123 (1976) 315-320.

NPL 2: M. H. Lindic et. al., Solid State Ionics, 176 (2005) 1529-1537,

NPL 3: N. Kumagai et al., Electrochim. Act., 27 (1982) 1087-1092.

NPL 4: M. S. Whittingham, Progress in Solid State Chemistry, 12 (1978) 41-99.

NPL 5: T. Yamamoto et al., J. Electrochem. Soc., 133 (1986) 1558-1561,

NPL 6: R. R. Chianelli, M. B. Dines, Inorg. Chem., 14 (1975) 2417-2421.

NPL 7: S. Shinha, D. W. Murphy, Solid State Ionics., 20 (1986) 81-84.

SUMMARY OF INVENTION

Technical Problem

The present invention has been made taking the above problem of the prior art into consideration. A primary object of the present invention is to provide a novel lithium titanium sulfide, lithium niobium sulfide, or lithium titanium niobium sulfide having excellent charge-discharge performance (in particular, excellent charge-discharge capacity and charge-discharge potential) useful as a cathode active material or the like for lithium batteries, such as metal lithium secondary batteries or lithium-ion secondary batteries.

The present inventors conducted extensive research to achieve the above object.

As a result, the inventors found that when lithium sulfide, titanium sulfide, and optionally sulfur, are used as starting materials and subjected to mechanical milling, a novel lithium titanium sulfide that has a cubic rock salt crystal structure with high lithium content can be obtained. When this lithium titanium sulfide is used as a cathode active material for lithium secondary batteries, it serves as an excellent material with a high charge-discharge capacity (in particular, high initial discharge capacity and high maximum charge-discharge capacity) and a high charge-discharge potential.

The present inventors found that when lithium sulfide and niobium sulfide, and optionally sulfur, are used as starting materials and subjected to mechanical milling, a novel lithium niobium sulfide is obtained that has a structure similar to that of lithium titanium sulfide with a cubic rock salt crystal structure, and that has a cubic crystal structure with a high lithium content. This lithium niobium sulfide has high conductivity. When used as a cathode active material for lithium batteries, the lithium niobium sulfide has a high charge-discharge capacity (in particular, high initial charge capacity) and serves as a material excellent in terms of charge-discharge cycle life (cycle characteristics).

The present inventors further found that it is possible to obtain lithium titanium niobium sulfide (a lithium titanium sulfide-lithium niobium sulfide system) when lithium sulfide, titanium sulfide, and niobium sulfide, and optionally sulfur, are used as starting materials and subjected to mechanical milling. Lithium titanium niobium sulfide has high conductivity. When used as a cathode active material for lithium batteries, lithium titanium niobium sulfide has a high charge-discharge capacity (in particular, high initial charge capacity) and serves as a material excellent in charge-discharge cycle life (cycle characteristics).

The present invention has been accomplished through further research based on the above findings. Specifically, the present invention includes the following.

Item 1. A sulfide comprising lithium, titanium and/or niobium, and sulfur as constituent elements.

Item 2. The sulfide according to Item 1, which is any one of the following (1) to (3):

(1) a lithium titanium sulfide comprising lithium, titanium, and sulfur as constituent elements and having a cubic rock salt crystal structure;

(2) a lithium niobium sulfide comprising lithium, niobium, and sulfur as constituent elements and having diffraction peaks at positions of at least 35.0°, 50.3°, and 62.7° in the diffraction angle range of 2θ=10° to 80° with a tolerance of ±2° in an X-ray diffractogram obtained using Cu Kα radiation; and (3) a lithium titanium niobium sulfide comprising lithium, titanium, niobium, sulfur as constituent elements and having diffraction peaks at positions of at least 30.5°, 35.3°, 50.6°, and 63.2° in the diffraction angle range of 2θ=10° to 80° with a tolerance of ±2° in an X-ray diffractogram obtained using Cu Kα radiation.

Item 3. The sulfide according to item 2, which is the lithium titanium sulfide of (1).

Item 4. The sulfide according to Item 3, which is represented by $Li_{n1}TiS_{m1}$ (wherein $0.4 \leq n1 \leq 6$ and $2 \leq m1 \leq 5$).

Item 5. The sulfide according to Item 3 or 4, which has diffraction peaks at positions of at least 30.6°, 35.5°, 51.0°, 60.6°, and 63.7° in the diffraction angle range of 2θ=10° to 80° with a tolerance of +2° in an X-ray diffractogram obtained using Cu Kα radiation.

Item 6. A method for producing the sulfide according to any one of Items 3 to 5, comprising a step of subjecting lithium sulfide, titanium sulfide, and optionally sulfur, to mechanical milling as starting materials.

Item 7. The sulfide according to Item 2, which is the lithium niobium sulfide of (2).

Item 8. The sulfide according to Item 7, wherein the composition ratio of sulfur S to niobium Nb, S/Nb, is in the range of 2 to 6 in terms of the molar ratio.

Item 9. The sulfide according to Item 7 or 8, wherein the composition ratio of lithium Li to niobium Nb, Li/Nb, is in the range of 1 to 5 in terms of the molar ratio.

Item 10. The sulfide according to any one of Items 7 to 9, which has a cubic crystal structure.

Item 11. The sulfide according to any one of Items 7 to 10, which has a diffraction peak at a position of 73.9° in the diffraction angle range of 2θ=10° to 80° with a tolerance of ±2° in an X-ray diffractogram obtained using Cu Kα radiation.

Item 12. A method for producing the sulfide according to any one of Items 7 to 11, comprising a step of subjecting lithium sulfide and niobium sulfide, and optionally sulfur, to mechanical milling as starting materials.

Item 13. The sulfide according to Item 2, which is the lithium titanium niobium sulfide of (3).

Item 14. The sulfide according to Item 13, wherein the composition ratio of sulfur S to the sum of titanium Ti and niobium Nb, S/(Ti+Nb), is in the range of 2 to 6 in terms of the molar ratio.

Item 15. The sulfide according to Item 13 or 14, wherein the composition ratio of lithium Li to the sum of titanium Ti and niobium Nb, Li/(Ti+Nb), is in the range of 0.4 to 6 in terms of the molar ratio.

Item 16. The sulfide according to any one of Items 13 to 15, which has a cubic crystal structure.

Item 17. The method for producing the sulfide according to any one of Items 13 to 16, comprising subjecting lithium sulfide, titanium sulfide, niobium sulfide, and optionally sulfur, to mechanical milling as starting materials.

Item 18. A charge and discharge product of the sulfide according to any one of Items 1 to 5, 7 to 11, and 13 to 16, or of a sulfide produced by the production method according to any one of Items 6, 12, and 17.

Item 19. An electrode for lithium batteries comprising, as an electrode active material, the sulfide according to any one of Items 1 to 5, 7 to 11, and 13 to 16, or a sulfide produced by the production method according to any one of Items 6, 12, and 17.

Item 20. The electrode for lithium batteries according to Item 19, which is a cathode for lithium batteries.

Item 21. A lithium battery comprising the electrode for lithium batteries according to Item 19 or 20.

Item 22. The lithium battery according to Item 21, further comprising a non-aqueous electrolyte comprising a carbonate-containing solvent.

Item 23. The lithium battery according to Item 22, wherein the carbonate content of the solvent in the non-aqueous electrolyte is 1 to 100 volume %.

Advantageous Effects of Invention

The lithium titanium sulfide, lithium niobium sulfide, and lithium titanium niobium sulfide according to the present invention are lithium-containing materials. Therefore, when such a sulfide is used as a cathode active material for lithium-ion secondary batteries, charge and discharge can be started from charge. Accordingly, materials not containing lithium can be used as an anode material, and a wide range of anode materials can be used.

Since the lithium titanium sulfide, lithium niobium sulfide, and lithium titanium niobium sulfide according to the present invention can contain a large amount of lithium, such sulfides have a high charge-discharge capacity, as well as a high charge-discharge potential resulting from stabilizing the structure. (Lithium titanium sulfide has a particularly high initial discharge capacity, maximum charge-discharge capacity, and charge-discharge potential, and lithium niobium sulfide and lithium titanium niobium sulfide have a particularly high initial discharge capacity.)

In particular, since the lithium titanium sulfide, lithium niobium sulfide, and lithium titanium niobium sulfide according to the present invention can contain a considerable amount of sulfur, a large amount of lithium can be intercalated and removed, thus obtaining a large amount of charge-discharge capacity derived from a sulfur redox reaction.

The lithium titanium sulfide, lithium niobium sulfide, and lithium titanium niobium sulfide according to the present invention have high conductivity. Among these, the lithium niobium sulfide and lithium titanium niobium sulfide of the present invention have very high conductivity.

The lithium titanium sulfide, lithium niobium sulfide, and lithium titanium niobium sulfide according to the present invention have high conductivity. Among these, the lithium niobium, sulfide and lithium titanium niobium sulfide of the present invention have a highly excellent charge-discharge cycle life (cycle characteristics).

Accordingly, the lithium titanium sulfide, lithium niobium sulfide, and lithium titanium niobium sulfide according to the present invention are useful as cathode active materials for lithium batteries (in particular, lithium secondary batteries) such as metal lithium secondary batteries and lithium-ion secondary batteries, and they can be effectively used as cathode active materials for non-aqueous electrolyte lithium secondary batteries comprising a non-aqueous solvent electrolyte, or all-solid lithium secondary batteries comprising a solid electrolyte.

Further, the lithium titanium sulfide, lithium niobium sulfide, and lithium titanium niobium sulfide according to the present invention can be used as ion conductors, electronic conductors, etc., and can also be used as anode active materials for lithium primary batteries and lithium secondary batteries.

Therefore, the lithium titanium sulfide, lithium niobium sulfide, and lithium titanium niobium sulfide according to the present invention are novel materials that have excellent performance and are useful for various purposes.

BRIEF DESCRIPTION OF DRAWINGS

FIG. 1 also shows peaks of $Li_2$ powder and $TiS_2$ powder used as starting materials. The peak of Kapton used for preventing air exposure is also detected.

FIG. 3 also shows peaks of $Li_2S$ powder used as a starting material. The peak of Kapton used for preventing air exposure is also detected.

FIG. 8 also shows the peaks of $Li_2S$ powder and $NbS_2$ powder used as starting materials. The peak of Kapton used for preventing air exposure is also detected.

FIG. 9 also shows the peak of $Li_3NbS_4$ simulated with a cubic rock salt crystal structure. The peak of Kapton used to prevent air exposure is also detected.

FIG. 10B is a graph (10 to 100°) showing X-ray diffraction patterns of the powders obtained in Examples 5 and 8. The peak of Kapton used to prevent air exposure is also detected.

FIG. 18 shows a battery using $Li_2TiS_3$ as a cathode active material.

DESCRIPTION OF EMBODIMENTS

Figure 1:
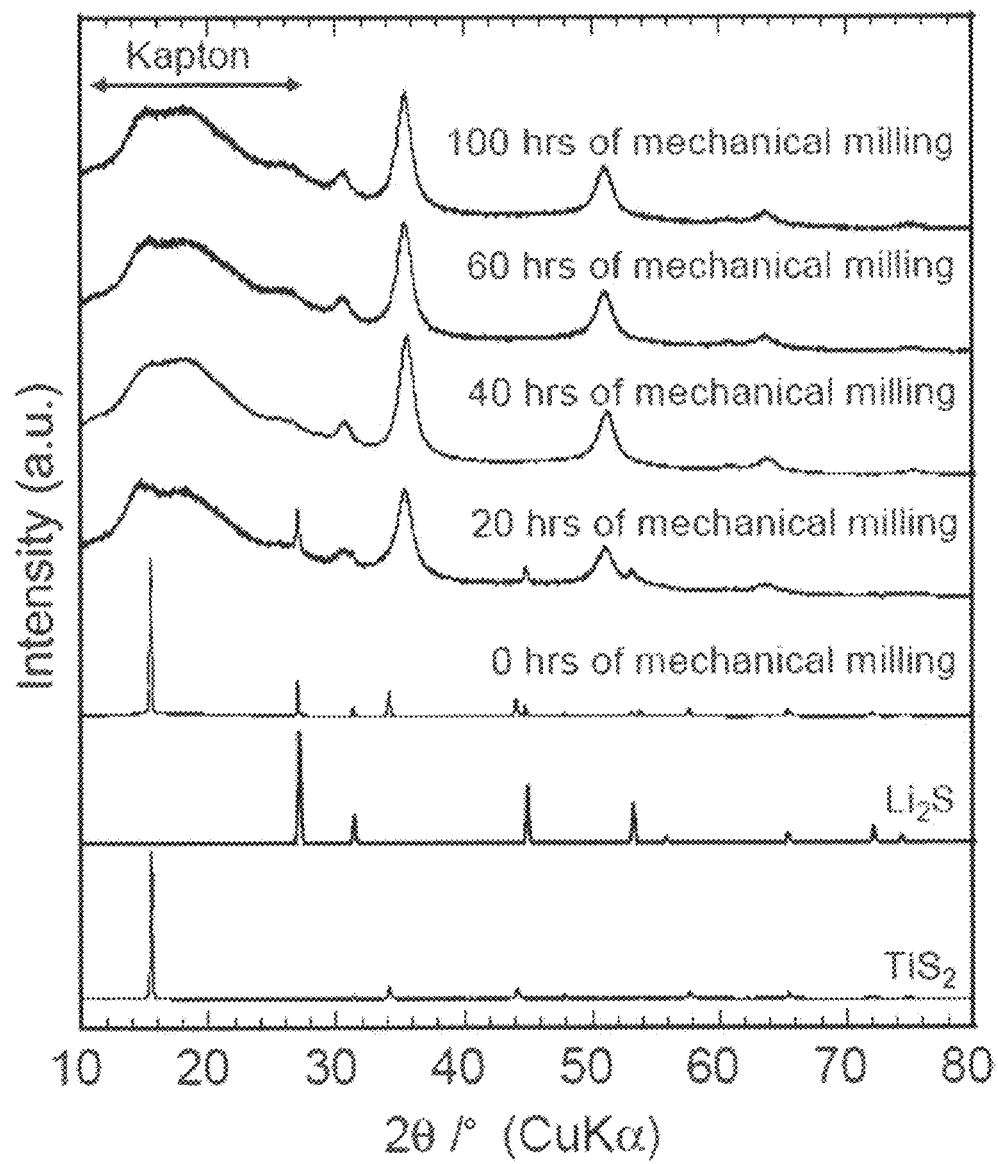
FIG. 1 is a graph showing X-ray diffraction patterns of the $Li_2TiS_3$ powders obtained by varying the mechanical milling time in Example 1.

The sulfides of the present invention are explained below in detail.

The sulfides of the present invention are sulfides comprising lithium, titanium and/or niobium, and sulfur as constituent elements. Examples of such sulfides of the present invention include (1) lithium titanium sulfides comprising lithium, titanium, and sulfur as constituent elements and having a cubic rock salt crystal structure, (2) lithium niobium sulfides comprising lithium, niobium, and sulfur as constituent elements and having diffraction peaks at positions of at least 35.0°, 50.3°, and 62.7° in the diffraction angle range of 2θ=10° to 80° with a tolerance of ±2 in an X-ray diffractogram obtained using Cu Kα radiation, and (3) lithium titanium niobium sulfides comprising lithium, titanium, niobium, and sulfur as constituent elements and having diffraction peaks at positions of at least 30.5°, 35.3°, 50.6°, and 63.2° in the diffraction angle range of 2θ=10° to 80° with a tolerance of ±2° in an X-ray diffractogram obtained using Cu Kα radiation.

1. Lithium Titanium Sulfide

The lithium titanium sulfide according to the present invention is a novel lithium titanium sulfide comprising lithium, titanium, and sulfur as constituent elements and having a cubic rock salt crystal structure.

Specifically, the crystal structure of the lithium titanium sulfide is preferably characterized by having diffraction peaks at positions of 30.6°, 35.5°, 51.0°, 60.6°, and 63.7° in the diffraction angle range of 2θ=10° to 80° with a tolerance of ±2° in an X-ray diffractogram obtained using Cu Kα radiation.

In the present invention, the half-value width of X diffraction peaks can be obtained by the powder X-ray diffraction method. For example, the half-value width can be measured under the following measurement conditions:

X-ray source: Cu Kα 50 kV-300 mA, measurement conditions: 2θ=10 to 80° or 10 to 100°, 0.02° per step, scan rate: 5 to 10°/min.

The lithium titanium sulfide is characterized by having diffraction peaks at the 2θ positions mentioned above. Further, the lithium titanium sulfide with good crystallinity preferably has a clear diffraction peak or peaks at any or all of 75.0°, 83.1°, 85.8°, and 96.5° in the diffraction angle range of 2θ=10° to 100° depending on the degree of crystallinity.

When assigned to a space group:

$$Fm\overline{3}m$$

based on the X-ray diffraction results, the lithium titanium sulfide is attributed to a rock salt crystal with a lattice constant of 4.8 to 5.3 Å. It is preferable that the lithium titanium sulfide having good crystallinity have a lattice constant in the range of 4.9 to 5.2 Å, the lithium titanium sulfide having better crystallinity have a lattice constant in the range of 4.95 to 5.15 Å, and the lithium titanium sulfide having particularly good crystallinity have a lattice constant in the range of 5.00 to 5.10 Å.

The crystal structure of the space group represented by:

$$Fm\overline{3}m$$

ideally has a=b=c and α=β=γ=90°. The lithium titanium sulfide of the present invention may also include, for example, those having a length of a, b, and c with a tolerance of ±5% and having an angle of α, β, and γ of 90°±2°. That is, the lithium titanium sulfide of the present invention can have an almost ideal cubic rock salt crystal structure.

As long as the lithium titanium sulfide of the present invention has a cubic rock salt crystal structure comprising lithium, titanium, and sulfur as constituent elements, the ratio of each element is not particularly limited. In particular, when n1 and m1 in the composition formula: Li$_{n1}$TiS$_{m1}$ are n1=2 and m1=3, the lithium titanium sulfide represented by this formula is considered to have a particularly stable ideal cubic rock salt crystal structure. From this viewpoint, the composition ratio of sulfur S to titanium Ti, S/Ti, is preferably in the range of 2 to 5, more preferably 2.2 to 4.5, and even more preferably 3 to 4, in terms of the molar ratio. The composition ratio of lithium Li to titanium Ti, Li/Ti, is preferably in the range of 0.4 to 6, more preferably 1 to 4, and even more preferably 1.5 to 3, in terms of the molar ratio. That is, when S/Ti is in the range of 3 to 4 and Li/Ti is in the range of 1.5 to 3, the lithium titanium sulfide of the present invention can have a particularly stable cubic rock salt crystal structure.

Specific examples of lithium titanium sulfides that meet such conditions include those represented by formula (1): Li$_{n1}$TiS$_{m1}$ [wherein 0.4≤n1≤6 (preferably 1≤n1≤4, and more preferably 1.5≤n1≤=3); 2≤m1≤5 (preferably 2.2≤m1≤4.5, and more preferably 3≤m1≤4)]. These lithium titanium sulfides are preferable because they have a stable cubic rock salt crystal structure.

The most stable lithium titanium sulfide is Li$_2$TiS$_3$.

The relationship between n1 and m1 in formula (1): Li$_{n1}$TiS$_{m1}$ is preferably m1=n1+1 because the sum of the number of lithium atoms and the number of titanium atoms matches the number of sulfur atoms, and the balance between the number of cations and the number of anions in the cubic rock salt crystal structure is maintained. 2m1=n1+4 is preferable because with the valence of lithium, titanium, and sulfur atoms being +1, +4, and −2, respectively, the balance between cations and anions can be maintained, and this facilitates the formation of a cubic rock salt crystal structure.

The lithium titanium sulfide of the present invention meets the above conditions. As long as the properties of the lithium titanium sulfide are not impaired, other impurities may be contained. Examples of such impurities include transition metals, typical metals, and like metals that may be introduced as contaminants into starting materials; and carbon, oxygen, etc., that may be introduced as contaminants into starting materials or during the production process. The residue of the starting materials (lithium sulfide, titanium sulfide, sulfur, etc.) and the products other than the desired product of the present invention may also be contained as impurities. The amount of such impurities is not particularly limited as long as the properties of the lithium titanium sulfide are not impaired. It is usually preferable that the amount of impurities be about 10 parts by weight or less, more preferably about 5 parts by weight or less, and even more preferably 3 parts by weight or less, per 100 parts by weight of the total amount of lithium, titanium, and sulfur in the lithium titanium sulfide that meets the conditions mentioned above.

When such impurities are present, diffraction peaks from impurities may be present, in addition to the peaks mentioned above, in the X-ray diffractogram.

2. Method for Producing Lithium Titanium Sulfide

The lithium titanium sulfide of the present invention can be obtained, for example, by using lithium sulfide, titanium sulfide, and optionally sulfur, as starting materials and subjecting the starting materials to mechanical milling.

The mechanical milling is a method of milling and mixing starting materials while imparting mechanical energy. According to this method, a mechanical impact and friction are given to the starting materials to mill and mix the materials, whereby lithium sulfide, titanium sulfide, and optionally sulfur, are vigorously contacted with each other and divided into fine particles to allow the reaction of the starting materials to proceed. That is, in this case, mixing, pulverization, and the reaction occur simultaneously. This enables the reaction of the starting materials to readily occur without heating the starting materials at a high temperature. Mechanical milling may provide a metastable crystal structure that cannot be obtained by ordinary heat treatment.

Specific examples of mechanical milling include mixing and pulverization using mechanical pulverizers, such as ball mills, rod mills, vibration mills, disc mills, hammer mills, let mills, and VSI mills.

The lithium sulfide used as a starting material is not particularly limited. Commercially available lithium sulfides can be used. In particular, using a high-purity lithium sulfide is preferable. Because lithium sulfide is mixed and pulverized by mechanical milling, the particle size of the lithium sulfide to be used is not particularly limited. A commercially available lithium sulfide powder can typically be used.

The titanium sulfide used as a starting material is also not particularly limited. Any commercially available titanium sulfide can be used. In particular, using a high-purity titanium sulfide is preferable. Because titanium sulfide is mixed and pulverized by mechanical milling, the particle size of the titanium sulfide to be used is not particularly limited. A commercially available titanium sulfide powder can typically be used.

The sulfur used as a starting material is also not particularly limited. Any sulfur can be used. In particular, using a high-purity sulfur is preferable. Because sulfur is mixed and pulverized by mechanical milling, the particle size of the sulfur to be used is not particularly limited. A commercially available sulfur powder can typically be used.

The mixing ratio of these starting materials may be set to the same as the element ratio of lithium, titanium, and sulfur in the desired lithium titanium sulfide.

Sulfur is prone to evaporate at temperatures too high. Therefore, when sulfur is used as a starting material, mechanical milling is preferably performed at a temperature of not more than 200° C., and more preferably about −10 to 170° C., so as to facilitate the formation of a desired polysulfide with a high sulfur content in order to obtain, a high-capacity electrode material.

The mechanical milling time is not particularly limited. The mechanical milling can be performed for any length of time until a lithium titanium sulfide having the desired cubic rock salt crystal structure is precipitated.

For example, the mechanical milling can be performed for about 0.1 to 100 hours while applying energy in an amount of 0.1 to 100 kWh/kg of the starting mixture.

The mechanical milling can produce the desired lithium titanium sulfide in the form of a fine powder. As a result, a fine powder lithium titanium sulfide with a mean particle size of about 1 to 20 μm, and more preferably about 2 to 10 μm, can be obtained. The mean particle size of lithium titanium sulfide refers to a median diameter ($d_{50}$) obtained by the dry laser diffraction scattering method.

3. Lithium Niobium Sulfide

The lithium niobium sulfide of the present invention is a novel lithium niobium sulfide comprising lithium, niobium, and sulfur as constituent elements, and having diffraction peaks at positions of at least 35.0°, 50.3°, and 62.7° in the diffraction angle range of 2θ=10° to 80° with a tolerance of ±2° in an X-ray diffractogram obtained using Cu Kα radiation.

In the present invention, the half-value width of X diffraction peaks can be determined by the powder X-ray diffraction method. For example, the half-value width can be measured under the following measurement conditions:

X-ray source: Cu Kα 50 kV-300 mA, measurement conditions: 2θ=10 to 80 or 10 to 100°, 0.02° per step, scan rate: 5 to 10°/min.

The lithium niobium sulfide is characterized by having diffraction peaks at the 2θ positions mentioned above. Further, the lithium niobium sulfide having good crystallinity preferably also has a diffraction, peak or peaks at any or all of 30.1°, 73.9°, 84.4° and 94.7° (in particular, 30.1° and 73.9°) in the diffraction angle range of 2θ=10° to 100°, depending on the degree of crystallinity.

When assigned to a space group:

$$Fm\bar{3}m$$

based on the X diffraction results, the lithium niobium sulfide is preferably attributed to a cubic crystal structure with a lattice constant of 4.9 to 5.3 Å. This crystal structure is preferably a cubic rock salt crystal structure. It is preferable that the lithium niobium sulfide having good crystallinity have a lattice constant in the range of 5.0 to 5.2 Å, and the lithium niobium sulfide having better crystallinity have a lattice constant in the range of 5.10 to 5.10 Å.

The crystal structure of the space group represented by $$Fm\bar{3}m$$

ideally has a=b=c and α=β=γ=90°. The lithium niobium sulfide of the present invention may include, for example, lithium niobium sulfide having a length of a, b, and c with a tolerance of ±5% and having an angle of α, β, and γ of 90±2°. That is, the lithium niobium sulfide of the present invention can have an almost ideal cubic rock salt crystal structure.

As long as the lithium niobium sulfide of the present invention comprises lithium, niobium, and sulfur as constituent elements and has diffraction peaks at the positions mentioned above, the ratio of each element is not particularly limited. In particular, when n2 and m2 in the composition formula: $Li_{n2}NbS_{m2}$ are n2=3 and m2=4, the lithium niobium sulfide represented by this formula is considered to have a particularly stable ideal cubic rock salt crystal structure. From this viewpoint, the composition ratio of sulfur S to niobium Nb, S/Nb, is preferably in the range of 2 to 6, more preferably 3 to 5, and even more preferably 3.5 to 4.5, in terms of the molar ratio. The composition ratio of lithium Li to niobium Nb, Li/Nb, is preferably in the range of 1 to 5, more preferably 2 to 4, and even more preferably 2.5 to 3.5 in terms of the molar ratio. That is, when S/Nb is in the range of 3.5 to 4.5 and Li/Nb is in the range of 2.5 to 3.5, the lithium niobium sulfide can have a particularly stable cubic crystal structure (in particular, a cubic rock salt crystal structure).

Specific examples of lithium niobium sulfides that meet such conditions include those represented by formula (2): $Li_{n2}NbS_{m2}$ [wherein $1 \leq n2 \leq 5$ (preferably $2 \leq n2 \leq 4$, and more preferably $2.5 \leq n2 \leq 3.5$); $2 \leq m2 \leq 6$ (preferably $3 \leq m2 \leq 5$, and more preferably $3.5 \leq m2 \leq 4.5$)]. These lithium niobium sulfides have a particularly stable cubic crystal structure (in particular, a cubic rock salt crystal structure) and are thus preferable.

The most stable lithium niobium sulfide is $Li_3NbS_4$.

The relation between n2 and m2 in formula (2): $Li_{n2}NbS_{m2}$ is preferably $m2=n2+1$ because the sum of the number of lithium atoms and the number of niobium atoms matches the number of sulfur atoms, and the balance is maintained between the number of cations and the number of anions in the cubic crystal structure (in particular, the cubic rock salt crystal structure). $2m1=n1+5$ is preferable because with the valence of lithium, titanium, and sulfur atoms being +1, +5, and −2, respectively, the balance between cations and anions can be maintained, and this facilitates the formation of a cubic crystal structure (in particular, a cubic rock salt crystal structure).

The lithium niobium sulfide of the present invention meets the above conditions. As long as the properties of the lithium niobium sulfide are not impaired, other impurities may be contained. Examples of such impurities include transition metals, typical metals, and like metals that may be introduced as contaminants into starting materials; and carbon, oxygen, etc., that may be introduced as contaminants into starting materials or during the production process. The residue of the starting materials (lithium sulfide, niobium sulfide, sulfur, etc.) and the products other than the desired product of the present invention may also be contained as impurities. The amount of such impurities is not particularly limited as long as the properties of the lithium niobium sulfide are not impaired. It is usually preferable that the amount of impurities be about 10 parts by weight or less, more preferably about 5 parts by weight or less, and even more preferably 3 parts by weight or less, per 100 parts by weight of the total amount of lithium, niobium, and sulfur in the lithium niobium sulfide that meets the conditions mentioned above.

When such impurities are present, diffraction peaks from impurities may be present, in addition to the peaks mentioned above, in the X-ray diffractogram.

4. Method for Producing Lithium Niobium Sulfide

The lithium niobium sulfide of the present invention can be obtained by a method similar to the method for producing lithium titanium sulfide. Specific methods are as described below.

The lithium titanium sulfide of the present invention can be obtained, for example, by using lithium sulfide, niobium sulfide, and optionally sulfur, as starting materials and subjecting the starting materials to mechanical milling.

Mechanical milling is a method of milling and mixing starting materials while imparting mechanical energy. In this method, a mechanical impact and friction are given to the starting materials to mill and mix the materials, whereby lithium sulfide, niobium sulfide, and optionally sulfur, are vigorously contacted with each other and divided into fine particles to allow the reaction of the starting materials to proceed. That is, in this case, mixing, pulverization, and the reaction occur simultaneously. This enables the reaction of the starting materials to reliably occur without heating the starting materials at a high temperature. Mechanical milling may provide a metastable crystal structure that cannot be obtained with ordinary heat treatment.

Specific examples of mechanical milling include mixing and pulverization using mechanical pulverizers, such as ball mills, rod mills, vibration mills, disc mills, hammer mills, let mills, and VSI mills.

The lithium sulfide used as a starting material is not particularly limited. Commercially available lithium sulfides can be used. In particular, using a high-purity lithium sulfide is preferable. Because lithium sulfide is mixed and pulverized by mechanical milling, the particle size of the lithium sulfide to be used is not particularly limited. A commercially available lithium sulfide powder can typically be used.

The niobium sulfide used as a starting material is also not particularly limited. Any commercially available niobium sulfide can be used. In particular, using a high-purity niobium sulfide is preferable. Because niobium sulfide is mixed and pulverized by mechanical milling, the particle size of the niobium sulfide to be used is not particularly limited. A commercially available niobium sulfide powder can typically be used.

The sulfur used as a starting material is also not particularly limited. Any sulfur can be used. In particular, using a high-purity sulfur is preferable. Because sulfur is mixed and pulverized by mechanical milling, the particle size of the sulfur to be used is not particularly limited. A commercially available sulfur powder can typically be used.

The mixing ratio of these starting materials may be set to the same as the element ratio of lithium, niobium, and sulfur in the desired lithium niobium sulfide.

Sulfur is prone to evaporate at temperatures too high. Therefore, when sulfur is used as a starting material, mechanical milling is preferably performed at a temperature of not more than 200° C., more preferably at about −10 to 170°, so as to facilitate the formation of a desired polysulfide with a high sulfur content in order to obtain a high-capacity electrode material.

The mechanical milling time is not particularly limited. The mechanical milling can be performed for any length of time until a lithium niobium sulfide having a desired cubic crystal structure is precipitated (in particular, a cubic rock salt crystal structure).

The mechanical milling can be performed, for example, for about 0.1 to 100 hours while applying energy in an amount of about 0.1 to 100 kWh/kg of the starting mixture.

The mechanical milling can produce the desired lithium niobium sulfide in the form of a fine powder. As a result, a fine powder lithium niobium sulfide with a mean particle size of about 1 to 20 µm, and more preferably about 2 to 10 µm, can be obtained. The mean particle size of lithium niobium sulfide refers to a median diameter ($d_{50}$) determined by the dry laser diffraction scattering method.

5. Lithium Titanium Niobium Sulfide

The lithium titanium niobium sulfide of the present invention is a novel lithium titanium niobium sulfide comprising lithium, titanium, niobium, and sulfur as constituent elements and having diffraction peaks at positions of at least 30.5°, 35.3°, 50.6°, and 63.2° in the diffraction angle range of $2\theta=10°$ to 80° with a tolerance of ±2° in an X-ray diffractogram obtained using Cu Kα radiation.

In the present invention, the half-value width of X diffraction peaks can be obtained by the powder X-ray diffraction method. For example, the half-value width can be measured under the following measurement conditions:

X-ray source: Cu Kα 50 kV-300 mA, measurement conditions: $2\theta=10$ to 80° or 10 to 100°, 0.02° per step, scan rate: 5 to 10°/min.

The lithium niobium sulfide is characterized by having diffraction peaks at the 2θ positions mentioned above. The sulfide having good crystallinity preferably also has a diffraction peak or peaks at any or all of 60.3°, 74.5°, 83.7°, and 95.6° (in particular, 60.3° and 74.5°) in the diffraction angle range of 2θ=10° to 100°, depending on the degree of crystallinity.

When assigned to a space group:

$$Fm\overline{3}m$$

based on the X-ray diffraction results, the lithium titanium niobium sulfide is attributed to a cubic crystal structure with a lattice constant of 4.8 to 5.3 Å. This crystal structure is preferably a cubic rock salt crystal structure. It is preferable that the lithium titanium niobium sulfide having good crystallinity have a lattice constant in the range of 4.9 to 5.2 Å, and the lithium titanium sulfide having better crystallinity have a lattice constant in the range of 4.95 to 5.15 Å, and the lithium titanium sulfide having particularly good crystallinity has as lattice constant in the range of 5.00 to 5.10 Å. The lattice constant of the lithium titanium niobium sulfide changes according to the ratio of titanium to the sum of titanium and niobium, Ti/(Ti+Nb). As Ti/(Ti+Nb) becomes closer to 1, the lattice constant is smaller. As Ti/(Ti+Nb) becomes closer to 0, the lattice constant is larger.

The crystal structure of the space group represented by $$Fm\overline{3}m$$

ideally has a=b=c and α=β=γ=90°. The lithium titanium niobium sulfide of the present invention may include, for example, lithium titanium niobium sulfides having a length of a, b, and c with a tolerance of ±5% and having an angle of α, γ, and γ of 90°±2°. That is, the lithium titanium niobium sulfide of the present invention can have an almost ideal crystal structure.

As long as the lithium titanium niobium sulfide of the present invention comprises lithium, titanium, niobium, and sulfur as constituent elements and has diffraction peaks at the positions mentioned above, the ratio of each element is not particularly limited. In particular, when n3 and m3 in the composition formula represented by $Li_{n3}Ti_{1-k}Nb_kS_{m3}$ are n3=2+k and m3=3+k, the lithium titanium niobium sulfide represented by this formula is considered to have a particularly stable ideal cubic crystal structure (in particular, a cubic rock salt crystal structure). From this viewpoint, the composition ratio of sulfur S to the sum of titanium Ti and the niobium Nb, S/(Ti+Nb), is preferably in the range of 2 to 6, more preferably 2.2 to 5, and even more preferably 3 to 4.5, in terms of the molar ratio. The composition ratio of lithium Li to the sum of titanium Ti and niobium Nb, Li/(Ti+Nb), is preferably in the range of 0.4 to 6, more preferably 1 to 4, and even more preferably 1.5 to 3.5, in terms of the molar ratio. That is, when S/(Ti+Nb) is in the range of 3 to 4.5 and Li/(Ti+Nb) is in the range of 1.5 to 3.5, the lithium titanium niobium sulfide can have a particularly stable cubic crystal structure (in particular, a cubic rock salt crystal structure). A higher ratio of niobium Nb to the sum of titanium Ti and niobium Nb, Nb/(Ti+Nb), provides better cycle characteristics and higher initial discharge capacity, whereas a lower ratio provides a higher charge-discharge potential and a higher charge-discharge capacity, thus being cost-effective. Therefore, balancing between them is preferable. Accordingly, for high-performance applications, Nb/(Ti+Nb), which is a value of more than 0 to less than 1, is preferably from 0.25 to less than 1, more preferably from 0.5 to less than 1, and even more preferably from 0.75 to less than 1.

Specific examples of lithium titanium niobium sulfides that meet such conditions include those represented by formula (3): $Li_{n3}Ti_{1-k}Nb_kS_{m3}$ [wherein 0.4≤n3≤6 (preferably 1≤n3≤4, and more preferably 1.5≤n3≤3.5); 2≤m3≤6 (preferably 2.2≤m3≤5, and more preferably 3≤m3≤4.5); and 0<k<1 (preferably 0.25≤k<1, more preferably 0.5≤k<1, and even more preferably 0.75≤k<=1).] These lithium titanium sulfides are preferable because they have a stable cubic crystal structure (in particular, a cubic rock salt crystal structure).

The lithium titanium niobium sulfide, which is represented by the composition formula shown above, actually has a composition represented by formula (4):

$$(1-k)Li_{n4}TiS_{m4}\text{-}kLi_{n2}NbS_{m2}$$

[wherein n2, m2, and k are as defined above; 0.4≤n4≤6 (preferably 1≤n4≤4, and more preferably 1.5≤n4≤3.5); 2≤m4≤6 (preferably 2.2≤m4≤5, and more preferably 3≤m4≤4.5).]

Lithium titanium niobium sulfides that have particularly good stability are $Li_{2.5}Ti_{0.5}Nb_{0.5}S_{3.5}$ (0.5$Li_2TiS_3$-0.5$Li_3NbS_4$), $Li_{2.75}Ti_{0.25}Nb$-0.75$S_{3.75}$ (0.25$Li_2TiS_3$-0.75$Li_3NbS_4$), $Li_{2.25}Ti_{0.75}Nb_{0.25}S_{3.25}$ (0.75$Li_2TiS_3$-0.25$Li_3NbS_4$), and the like.

The relationship between n3 and m3 in formula (3) $Li_{n3}Ti_{1-k}Nb_kS_{m3}$ is preferably m3=n3+1 because the sum of the valence of lithium atoms, titanium atoms, and niobium atoms matches the valence of sulfur atoms, and the balance between the cations and anions in the cubic crystal structure (in particular, the cubic rock salt crystal structure) is maintained. That is, in formula (4): (1-k)$Li_{n4}TiS_{m4}$-$kLi_{n2}NbS_{m2}$, m2=n2+1 and m4=n4+1 are preferable because the sum of the valence of lithium atoms and titanium or niobium atoms matches the valence of sulfur atoms, and the balance between cations and anions in the cubic crystal structure (in particular, the cubic rock salt crystal structure) can be maintained.

The lithium titanium niobium sulfide of the present invention meets the above conditions. As long as the properties of the lithium titanium niobium sulfide are not impaired, other impurities may be contained. Examples of such impurities include transition metals, typical metals, and like metals that may be introduced as contaminants into starting materials; and carbon, oxygen, etc., that may be introduced as contaminants into starting materials or during the production process. The residue of the starting materials (lithium sulfide, titanium sulfide, titanium niobium, sulfur, etc.) and the products other than the desired product of the present invention may also be contained as impurities. The amount of such impurities is not particularly limited as long as the properties of the lithium titanium niobium sulfide are not impaired. It is usually preferable that the amount of impurities be about 10 parts by weight or less, more preferably 5 parts by weight or less, and even more preferably 3 parts by weight or less, per 100 parts by weight of lithium, titanium, niobium, and sulfur in the lithium titanium niobium sulfide that meets the conditions mentioned above.

When such impurities are present, diffraction peaks from impurities may be present, in addition to the peaks mentioned above, in the X-ray diffractogram.

6. Method for Producing Lithium Titanium Niobium Sulfide

The lithium titanium niobium sulfide according to the present invention can be obtained by a method similar to the method for producing lithium titanium sulfide. Specific methods are as described below.

The lithium titanium niobium sulfide of the present invention can be obtained, for example, by using lithium sulfide, titanium sulfide, niobium sulfide, and optionally sulfur, as starting materials and subjecting the starting materials to mechanical milling.

The mechanical milling is a method of milling and mixing starting materials while imparting mechanical energy. According to this method, a mechanical impact and friction are given to starting materials to mill and mix the materials, whereby lithium sulfide, titanium sulfide, niobium sulfide, and optionally sulfur, are vigorously contacted with each other and divided into fine particles to allow the reaction of the starting materials to proceed. That is, in this case, mixing, pulverization, and the reaction occur simultaneously. This enables the reaction of the starting materials to reliably occur without heating the starting materials at a high temperature. Mechanical milling may provide a metastable crystal structure that cannot be obtained by ordinary heat treatment.

Specific examples of mechanical milling include mixing and pulverization, using mechanical pulverizers, such as ball mills, rod mills, vibration mills, disc mills, hammer mills, jet mills, and VSI mills.

The lithium sulfide used as a starting material is also not particularly limited. Commercially available lithium sulfides can be used. In particular, using a high-purity lithium sulfide is preferable. Because lithium sulfide is mixed and pulverized by mechanical milling, the particle size of the lithium sulfide to be used is not particularly limited. A commercially available lithium sulfide powder can typically be used.

The titanium sulfide used as a starting material is also not particularly limited. Any commercially available titanium sulfide can be used. In particular, using a high-purity lithium sulfide is preferable. Because titanium sulfide is mixed and pulverized by mechanical milling, the particle size of the titanium sulfide to be used is not particularly limited. A commercially available titanium sulfide powder can typically be used.

The niobium sulfide used as a starting material is also not particularly limited. Any commercially available niobium sulfide can be used. In particular, using a high-purity niobium sulfide is preferable. Because niobium sulfide is mixed and pulverized by mechanical milling, the particle size of the niobium sulfide to be used is not particularly limited. A commercially available niobium sulfide powder can typically be used.

The sulfur used as a starting material is also not particularly limited. Any sulfur can be used. In particular, using high-purity sulfur is preferable. Because sulfur is mixed and pulverized by mechanical milling, the particle size of the sulfur to be used is not particularly limited. Commercially available sulfur powder can typically be used.

The mixing ratio of these starting materials may be set to the same as the element ratio of lithium, titanium, niobium, and sulfur in the desired lithium titanium niobium sulfide.

Sulfur is prone to evaporate at temperatures too high. Therefore, when sulfur is used as a starting material, mechanical milling is preferably performed at a temperature of not more than 200° C., more preferably at about −10 to 170° C., so as to facilitate the formation of a desired polysulfide having a high sulfur content in order to obtain a high capacity.

The mechanical milling time is not particularly limited. The mechanical milling can be performed for any length of time until a lithium titanium niobium sulfide having a desired cubic crystal structure (in particular, a cubic rock salt crystal structure) is precipitated.

For example, the mechanical milling can be performed for about 0.1 to 100 hours while applying energy in an amount of about 0.1 to 100 kWh/kg of the starting mixture.

The mechanical milling produces the desired lithium titanium niobium sulfide in the form of a fine powder. As a result, it is possible to obtain a fine powder lithium titanium niobium sulfide with a mean particle size of about 1 to 20 µm, and more preferably about 2 to 10 µm. The mean particle size of lithium titanium niobium sulfide refers to a median diameter ($d_{50}$) obtained by the dry laser diffraction scattering method.

7. Use of Lithium Titanium Sulfide, Lithium Niobium Sulfide, and Lithium Titanium Niobium Sulfide The lithium titanium, sulfide, lithium niobium sulfide, and lithium titanium niobium sulfide are useful as ionic conductors and electronic conductors, as well as electrode active materials, etc., for lithium batteries, such as lithium primary batteries, lithium-ion secondary batteries, and metal lithium secondary batteries. These sulfides can be used as cathode active materials and anode active materials. In particular, the lithium titanium sulfide, lithium niobium sulfide, and lithium titanium niobium sulfide of the present invention, which contain lithium in the structure, can start charge and discharge from charge. Therefore, when such a material is used as a cathode active material, a material not containing lithium can be used as an anode. It is also possible to use a material containing lithium as an anode. Therefore, the material can be selected from a broader range.

The lithium secondary battery comprising at least one member selected from the group consisting of lithium titanium sulfide, lithium niobium sulfide, and lithium titanium niobium sulfide of the present invention as a cathode active material may be a non-aqueous electrolyte lithium secondary battery comprising a non-aqueous solvent electrolyte as an electrolyte, or an all-solid lithium secondary battery comprising a lithium-ion-conductive solid electrolyte.

The structures of the non-aqueous electrolyte lithium secondary battery and the all-solid lithium secondary battery may be the same as those of known lithium secondary batteries except that at least one member selected from the group consisting of lithium titanium sulfide, lithium niobium sulfide, and lithium titanium niobium sulfide of the present invention is used as a cathode active material and/or an anode active material (in particular, a cathode active material).

For example, the basic structure of the non-aqueous electrolyte lithium secondary battery may be the same as that of a known non-aqueous electrolyte lithium secondary battery except that at least one member selected from the group consisting of lithium titanium sulfide, lithium niobium sulfide, and lithium titanium niobium sulfide as mentioned above is used as a cathode active material and/or an anode active material.

For cathodes, at least one member selected from the group consisting of lithium titanium sulfide, lithium niobium sulfide, and lithium titanium niobium sulfide as mentioned above is used as a cathode active material and mixed with a binder and a conductive agent to prepare a cathode material mixture, and the cathode material mixture may be supported on a cathode current collector, such as aluminum, nickel, stainless steel, or carbon cloth. Examples of conductive agents include carbon materials such as graphite, cork, carbon black, and acicular carbon.

For anodes, a material containing lithium and a material not containing lithium may be used together. For example, graphite, sintering-resistant carbon, lithium metal, tin, silicon, alloys containing tin and silicon, SiO, etc., can be used.

Such anode active materials may also be mixed with a conductive agent, a binder, etc., if necessary, and the resulting product may be supported on an anode current collector comprising Al, Cu, Ni, stainless steel, carbon, etc. As an anode active material, it is also possible to use at least one member selected from the group consisting of lithium titanium sulfide, lithium niobium sulfide, and lithium titanium niobium sulfide of the present invention. When at least one member selected from the group consisting of lithium titanium sulfide, lithium niobium sulfide, and lithium titanium niobium sulfide of the present invention is used as an as anode active material, existing materials such as lithium cobalt oxide ($LiCoO_2$), lithium nickel oxide ($LiNiO_2$), lithium manganese oxide ($LiMn_2O_4$), lithium iron phosphate ($LiFePO_4$), vanadium oxide materials, and sulfur materials can be used as cathode active materials.

Examples of separators include those that are made of polyethylene, polypropylene, and like polyolefin resins, fluororesin, nylon, aromatic aramid, inorganic glass, and like materials and that are in the form of a porous membrane, a nonwoven fabric, a woven fabric, or the like.

Examples of solvents for non-aqueous electrolytes include solvents known as non-aqueous secondary battery solvents, such as carbonates, ethers, nitriles, sulfur-containing compounds. Among these, ether solvents that are generally used for sulfur electrodes, and carbonates that are used for commercially available lithium-ion batteries are preferable. When the lithium titanium sulfide, lithium niobium sulfide, or lithium titanium, niobium sulfide of the present invention is used, the resulting battery can be charged and discharged well even with use of ether solvents or carbonate solvents, in spite of the fact that in conventional batteries comprising elemental sulfur or lithium sulfide as a cathode, ether solvents dissolve polysulfides and reduce the charge-discharge efficiency, and carbonate solvents hardly cause charge and discharge. Carbonates are more preferable from the viewpoint of ease of constructing safer lithium batteries.

According to a particularly preferable embodiment of the present invention, a lithium battery that comprises a non-aqueous electrolyte comprising a carbonate-containing solvent, and the cathode active material of the present invention can be constructed. In particular, the carbonate content of the solvent of the non-aqueous electrolyte can be 1 to 100 volume %, and preferably 90 to 100 volume %.

The all-solid lithium secondary battery may have the same structure as a known all-solid lithium secondary battery except that the cathode active material of the present invention is used.

In this case, examples of usable electrolytes include polymer solid electrolytes such as polyethylene oxide polymer compounds, and polymer compounds comprising at least one member selected from the group consisting of polyorganosiloxane chains and polyoxyalkylene chains, as well as sulfide solid electrolytes and oxide solid electrolytes.

To produce a cathode for all-solid lithium secondary batteries, for example, at least one member selected from the group consisting of lithium titanium sulfide, lithium niobium sulfide, and lithium titanium niobium sulfide of the present invention is used as a cathode active material and mixed with a conductive agent, a binder, and a solid electrode to prepare a cathode material mixture, and the cathode material mixture may be supported on a cathode current collector, such as aluminum, nickel, or stainless steel. Examples of conductive agents may be the same as those used for non-aqueous solvent secondary batteries, such as graphite, cork, carbon black, acicular carbon, and like carbon materials. When at least one member selected from the group consisting of lithium titanium sulfide, lithium niobium sulfide, and lithium titanium niobium sulfide of the present invention is used as an anode active material, existing materials such as lithium cobalt oxide ($LiCoO_2$), lithium nickel oxide ($LiNiO_2$), lithium manganese oxide ($LiMn_2O_4$), lithium iron phosphate ($LiFePO_4$), vanadium oxide materials, and sulfur materials can be used as cathode active materials.

For anodes, as in non aqueous secondary batteries, a material containing lithium and a material not containing lithium may be used together. For example, graphite, sintering-resistant carbon, lithium metal, tin, silicon, alloys containing tin and silicon, and SiO can be used. Such an anode active material may also be mixed with a conductive agent, a binder, etc., if necessary, and the resulting product may be supported on an anode current collector, such as Al, Cu, Ni, stainless steel, or carbon. It is also possible to use at least one member selected from the group consisting of lithium titanium sulfide, lithium niobium sulfide, and lithium titanium niobium sulfide of the present invention as an anode active material.

The non-aqueous electrolyte lithium secondary battery and all-solid lithium secondary battery may also be of any suitable shape, such as cylindrical or square.

When lithium sulfide ($Li_2S$) or elemental sulfur ($S_8$) is used as a cathode active material, using ether as a solvent for a non-aqueous electrolyte (electrolytic solution) causes elution of $Li_2S$ and $S_8$ in the non-aqueous electrolyte (electrolytic solution). On the other hand, when lithium sulfide ($Li_2S$) or elemental sulfur ($S_8$) is used as a cathode active material, using a carbonate as a solvent for a non-aqueous electrolyte (electrolytic solution) causes the reaction of the non-aqueous electrolyte (electrolytic solution) with the cathode. Accordingly, the battery cannot be charged or discharged by using lithium sulfide ($Li_2S$) or elemental sulfur ($S_8$) as a cathode active material. In contrast, when the lithium titanium sulfide, lithium niobium sulfide, or lithium titanium niobium sulfide of the present invention is used, the resulting battery can be charged or discharged even when ether or carbonate is used as a solvent for a non-aqueous electrolyte (an electrolytic solution).

The present invention is described below in more detail with reference to Examples, but is not limited to the Examples below.

Example 1: Synthesis of $Li_2TiS_3$ Powders

A commercially available lithium sulfide ($Li_2S$) powder and titanium disulfide ($TiS_2$) powder were weighed and mixed to a molar ratio of 1:1 in an argon-atmosphere glove box. The mixture was then subjected to mechanical milling with a ball mill (Fritsch P7, classic line) at 510 rpm for 20 to 100 hours using a 45-mL container containing about 500 zirconia balls with a diameter of 4 mm to obtain $Li_2TiS_3$ powders.

Example 2: Synthesis of $Li_{2.33}TiS_{3.33}$ Powder

A commercially available lithium sulfide ($Li_2S$) powder, titanium disulfide ($TiS_2S$) powder, and sulfur (S) powder were weighed and mixed to a molar ratio of 7:6:1 in an argon-atmosphere glove box. The mixture was then subjected to mechanical milling with a ball mill (Fritsch P7, classic line) at 510 rpm for 40 hours using a 45-mL container containing about 500 zirconia balls with a diameter of 4 mm to obtain a $Li_{2.33}TiS_{3.33}$ powder.

Example 3: Synthesis of $Li_3TiS_4$ Powder

A commercially available lithium sulfide ($Li_2S$) powder, titanium disulfide ($TiS_2$) powder, and sulfur (S) powder were weighed and mixed to a molar ratio of 3:2:1 in an argon-atmosphere glove box. The mixture was then subjected to mechanical milling with a ball mill (Fritsch P7, classic line) at 510 rpm for 40 hours using a 45-mL container containing about 500 zirconia balls with a diameter of 4 mm to obtain a $Li_3TiS_4$ powder.

Example 4: Synthesis of $Li_4TiS_5$ Powder

A commercially available lithium sulfide ($Li_2S$) powder, titanium disulfide ($TiS_2$) powder, and sulfur (S) powder were weighed and mixed to a molar ratio of 2:1:1 in an argon-atmosphere glove box. The mixture was then subjected to mechanical milling with a ball mill (Fritsch P7, classic line) at 510 rpm for 40 hours using a 45-mL container containing about 500 zirconia balls with a diameter of 4 mm to obtain a $Li_4TiS_5$ powder.

Example 5: Synthesis of $Li_3NbS_4$ Powder

A commercially available lithium sulfide ($Li_2S$) powder, niobium disulfide ($NbS_2$) powder, and sulfur ($S_8$) powder were weighed and mixed to a molar ratio of 24:16:1 in an argon-atmosphere glove box. The mixture was then subjected to mechanical milling with a ball mill (Fritsch P7, classic line) at 510 rpm for 60 hours using a 45-mL container containing about 500 zirconia balls with a diameter of 4 mm to obtain a $Li_3NbS_4$ powder.

Example 6: Synthesis of $Li_3NbS_4$ Powder

A commercially available lithium sulfide ($Li_2S$) powder, niobium sulfide ($NbS_2$) powder, and sulfur ($S_8$) powder were weighed and mixed to a molar ratio of 24:16:1 in an argon-atmosphere glove box. The mixture was then subjected to mechanical milling with a ball mill (Fritsch P7, classic line) at 510 rpm for 90 hours using a 45-mL container containing about 500 zirconia balls with a diameter of 4 mm to obtain a $Li_3NbS_4$ powder.

Example 7: Synthesis of $Li_{2.5}Ti_{0.5}Nb_{0.5}S_{3.5}$ Powder

A commercially available lithium sulfide ($Li_2S$) powder, titanium disulfide ($TiS_2$) powder, niobium disulfide ($NbS_1$) powder, and sulfur ($S_8$) powder were weighed and mixed to a molar ratio of 40:16:16:1 in an argon-atmosphere glove box. The mixture was then subjected to mechanical mining with a ball mill (Fritsch P7, classic line) at 510 rpm for 60 hours using a 45-mL container containing about 500 zirconia balls with a diameter of 4 mm to obtain a $Li_{2.5}Ti_{0.5}Nb_{0.5}S_{3.5}$ powder ($0.5Li_2TiS_3$-$0.5Li_3NbS_4$) powder.

Example 8: Synthesis of $Li_{2.75}Ti_{0.25}Nb_{0.75}S_{3.75}$ Powder

A commercially available lithium sulfide ($Li_2S$) powder, titanium disulfide ($TiS_2$) powder, niobium disulfide ($NbS_2$) powder, and sulfur ($S_8$) powder were weighed and mixed to a molar ratio of 88:16:48:3 in an argon-atmosphere glove box. The mixture was then subjected to mechanical milling with a ball mill (Fritsch P7, classic line) at 510 rpm for 60 hours using a 45-mL container containing about 500 zirconia balls with a diameter of 4 mm to obtain a $Li_{2.75}Ti_{0.25}Nb_{0.75}S_{3.75}$ powder ($0.25Li_2TiS_3$-$0.75Li_3NbS_4$) powder.

Test Example 1: X-ray Diffraction (No. 1)

Figure 3:
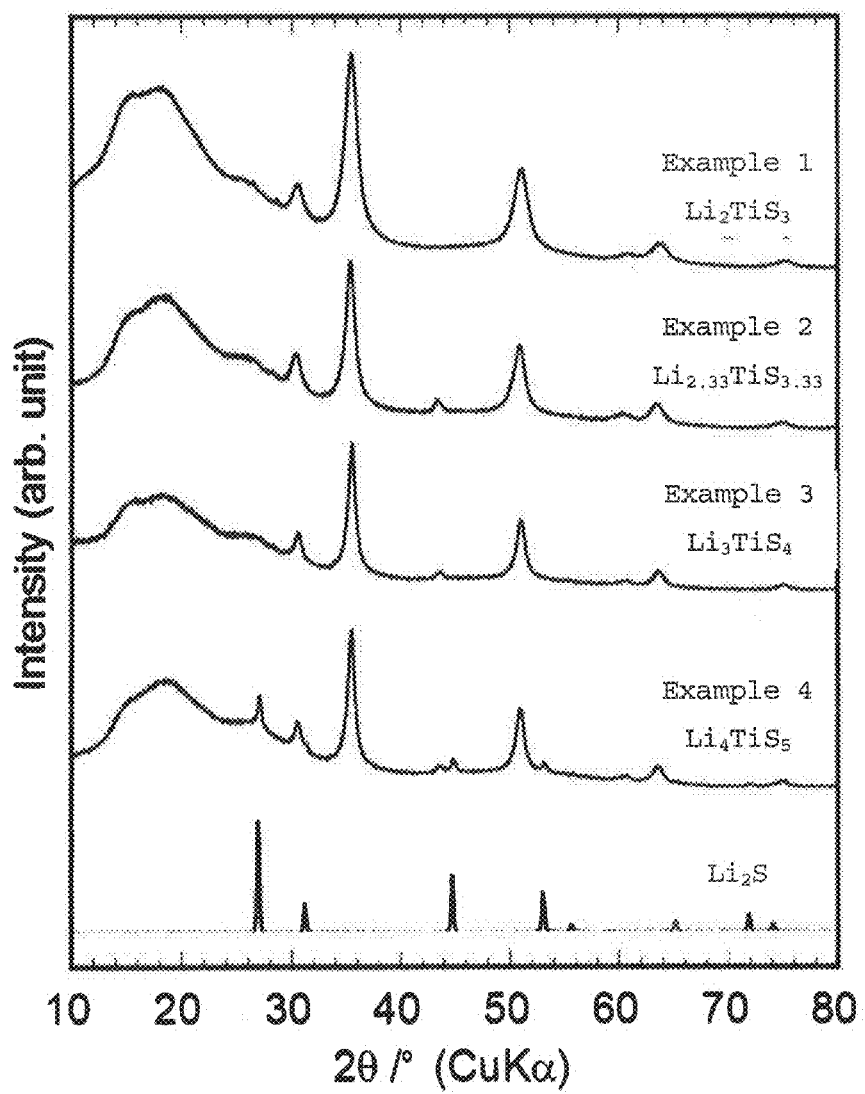
FIG. 3 is a graph showing X-ray diffraction patterns of the $Li_{n1}TiS_{m1}$ powders obtained in Examples 1 to 4.

The powders obtained in Example 1 were subjected to X-ray diffraction (XRD) using Cu Kα radiation. FIGS. 1 and 3 show the results. For reference, FIG. 1 also shows the peaks of lithium sulfide ($Li_2S$) and titanium sulfide ($TiS_2$) used as starting materials. FIG. 3 also shows the peaks of lithium sulfide ($Li_2S$) used as a starting material. In the XRD measurement of all the powders, a Kapton film was used to avoid exposing the obtained test samples to air. Therefore, the peak of Kapton is also observed at approximately 2θ=10 to 25°.

The X-ray diffraction diagrams shown in FIGS. 1 and 3 confirm that all the samples obtained by mechanical milling for 20 to 100 hours had diffraction peaks at positions of 2θ=30.6, 35.5, 51.1, 60.8, 63.8, 75.2, 86.0, and 96.7°. These peaks can be assigned to a space group:

$Fm\bar{3}m$ and can be attributed to cubic rock salt crystals with a lattice constant of 5.05 (7) Å. The obtained XRD profile conforms well to the results of pattern fitting analysis using a rock salt crystal structure model having a lattice constant of 5.057 Å and a Li:Ti:S ratio of 2:1:3. This result shows that the element ratio of the powder obtained in Example 1 is Li:Ti:S=2:1:3.

Figure 2:
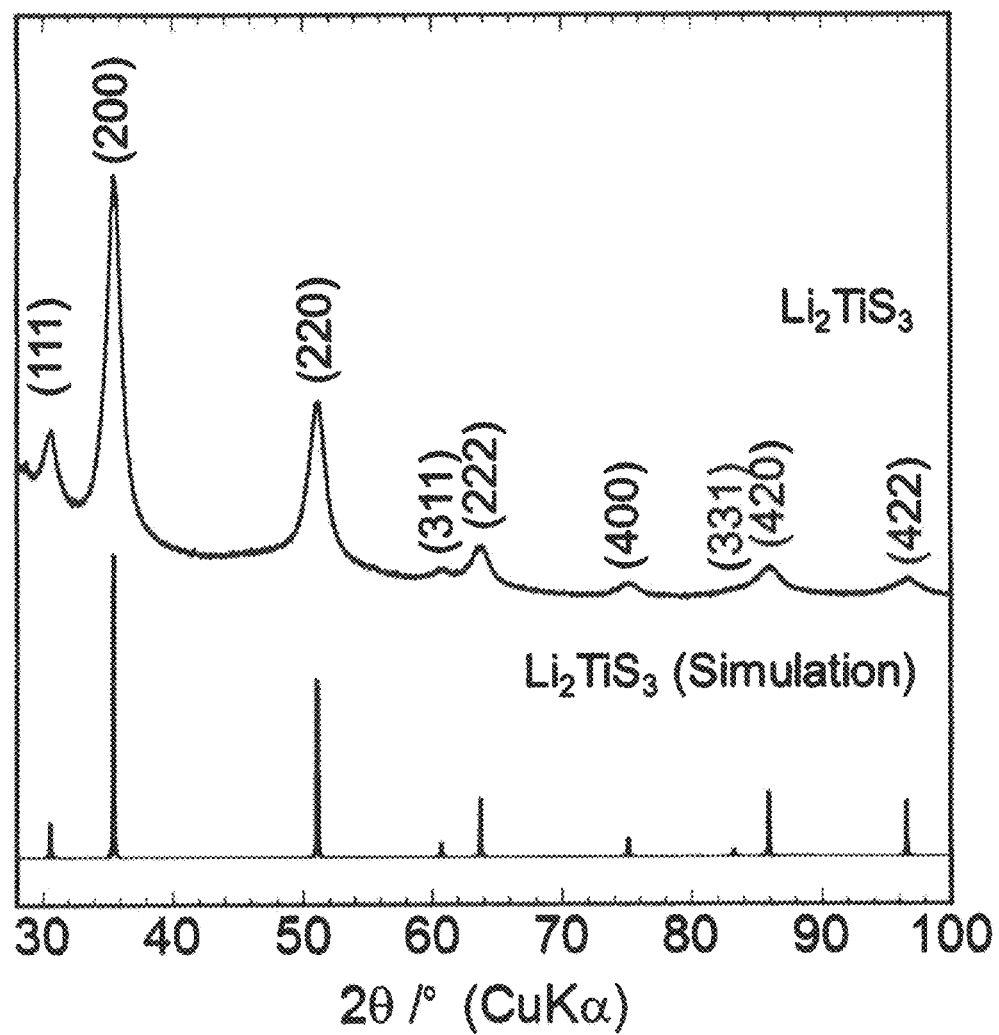
FIG. 2 is a graph showing the X-ray diffraction pattern of $Li_2TiS_3$ obtained by setting the mechanical milling time to 40 hours in Example 1, and the X-ray diffraction pattern obtained from simulation results of the diffraction angle and strength of a cubic rock salt crystal $Li_2TiS_3$ with a lattice constant of 5.06 Å.

FIG. 2 shows the XRD pattern of $Li_2TiS_3$ obtained by 40 hours of mechanical milling in Example 1, and the XRD pattern obtained from simulation results of the diffraction angle and intensity of a cubic rock salt crystal $Li_2TiS_3$ with a lattice constant of 5.06 Å shown in Table 1.

TABLE 1

| h | k | l | 2θ/deg | d/Å | Intensity |
|---|---|---|--------|------|-----------|
| 1 | 1 | 1 | 30.6 | 2.92 | 16 |
| 2 | 0 | 0 | 35.5 | 2.53 | 100 |
| 2 | 2 | 0 | 51.0 | 1.79 | 61 |
| 3 | 1 | 1 | 60.6 | 1.53 | 5 |
| 2 | 2 | 2 | 63.7 | 1.46 | 19 |
| 4 | 0 | 0 | 75.0 | 1.27 | 8 |
| 3 | 3 | 1 | 83.1 | 1.16 | 2 |
| 4 | 2 | 0 | 85.8 | 1.13 | 23 |
| 4 | 2 | 2 | 96.5 | 1.03 | 18 |

As is clear from FIG. 2, the XRD pattern of $Li_2TiS_3$ obtained by 40 hours of mechanical milling conforms well to the XRD pattern obtained from simulation results of the diffraction angle and intensity of the rock salt crystal $Li_2TiS_3$ with a lattice constant of 5.06 Å.

The powder obtained in Example 2 was subjected to X-ray diffraction (XRD) using Cu Kα radiation. FIG. 3 shows the results. For reference, FIG. 3 also shows the peaks of lithium sulfide ($Li_2S$) used as a starting material. In the XRD measurement, a Kapton film was used to avoid exposing the obtained test sample to air. Therefore, the peak of Kapton is also observed at approximately 2θ=10 to 25°. The X-ray diffraction patterns shown in FIG. 3 confirm diffraction peaks at positions of 2θ=30.5°, 35.5°, 43.7°, 51.1°, 60.5°, 63.6°, and 75.1°. In addition to the peaks shown in Example 1, a new peak is observed at approximately 2θ=43.7°. This is considered to be derived from impurity.

These peaks, except for the peak at 2θ=43.7°, can be attributed to the cubic rock salt crystal with a lattice constant of 5.06 Å.

The powder obtained in Example 3 was subjected to X-ray diffraction (XRD) using Cu Kα radiation. FIG. 3 shows the results. For reference, FIG. 3 also shows the peaks of lithium sulfide (Li$_2$S) used as a starting material. In the XRD measurement, a Kapton film was used to avoid exposure of the obtained test sample to air. Therefore, the peak of Kapton is also observed at approximately 2θ=10 to 25. The X-ray diffraction diagram shown in FIG. 3 confirms diffraction peaks at positions of 2θ=30.6°, 35.5°, 43.7°, 51.1°, 60.5°, 63.7°, 75.1°, 83.1°, 85.9°, and 96.4°. In addition to the peaks shown in Example 1, a new peak is observed at approximately 2θ=43.7°. This is considered to be derived from impurity. These peaks, except for the peak at approximately 20θ=43.7°, can be attributed to cubic rock salt crystals with a lattice constant of 5.06 Å.

The powder obtained in Example 4 was subjected to X-ray diffraction (XRD) using Cu Kα radiation. FIG. 3 shows the results. For reference, FIG. 3 also shows the peaks of lithium sulfide (Li$_2$S) used as a starting material. In the XRD measurement, a Kapton film was used to avoid exposing the obtained test sample to air. Therefore, the peak of Kapton is also observed at approximately 2θ=10 to 25°. The X-ray diffraction diagram shown in FIG. 3 confirms diffraction peaks at positions of 2θ=27.0°, 30.5°, 31.4°, 35.5°, 43.7°, 44.9°, 51.0°, 53.2°, 55.8°, 60.6°, 63.6°, 65.4°, 72.0°, and 74.9°. Further, a peak (to 27°) attributed to Li$_2$S is also observed.

These peaks show that the product obtained by mechanical milling in Example 4 is a complex of Li$_2$S and a cubic rock salt analogue crystal having a lattice constant of 5.06 Å.

Test Example 2: Electrochemical Production and Evaluation of Lithium Titanium Sulfide An electrochemical cell was produced by the following method using the Li$_2$TiS$_3$ powder obtained by 40 hours of mechanical milling in Example 1.

First, acetylene black and polytetrafluoroethylene (PTFE) as a binder were added to the Li$_2$TiS$_3$ powder obtained in Example 1 to a weight ratio of Li$_2$TiS$_3$ powder:acetylene black:PTFE=86:9:5. After kneading with a mortar for 15 minutes, the resulting mixture was applied to an aluminum mesh to form a working electrode. Polypropylene was used as a separator, and lithium was used as a counter electrode. As an electrolyte, a solution of 1M lithium bis(trifluoromethanesulfonyl)amide (LiTFSA) in a mixed solvent of 1,3-dioxolane (DOL) and 1,2-dimethoxyathane (DME) (1M LiTFSA DOL/DME) was used.

Figure 4:
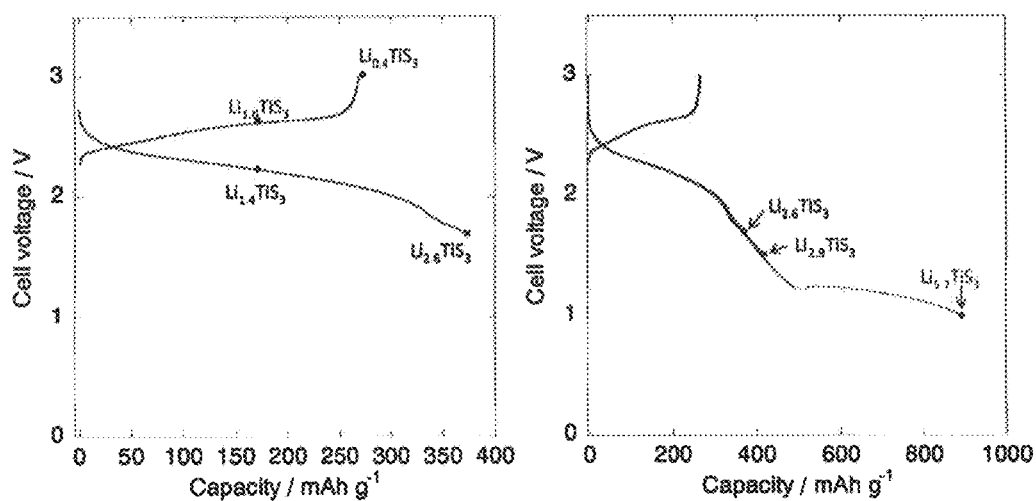
FIG. 4 is a graph showing charge-discharge curves obtained in Test Example 2, and the amount of current flow for obtaining the lithium titanium sulfide of each composition.

The obtained electrochemical cell was subjected to a constant-current charge-discharge test with a current density of 20 mA/g, and lithium was intercalated into or removed from Li$_2$TiS$_3$ to produce lithium titanium sulfides represented by composition formulas: Li$_{0.4}$TiS$_3$, Li$_{1.0}$TiS$_3$, Li$_{1.4}$TiS$_3$, Li$_{2.6}$TiS$_3$, and Li$_{5.7}$TiS$_3$. The specific amount of current flow for obtaining the lithium titanium sulfide of each composition was set to the amount of current flow corresponding to the theoretical amount required to make the desired amount of Li present in the lithium titanium sulfide of the desired composition. The amounts of current flow for producing lithium titanium sulfides are shown on the charge-discharge curves in FIG. 4.

Figure 5:
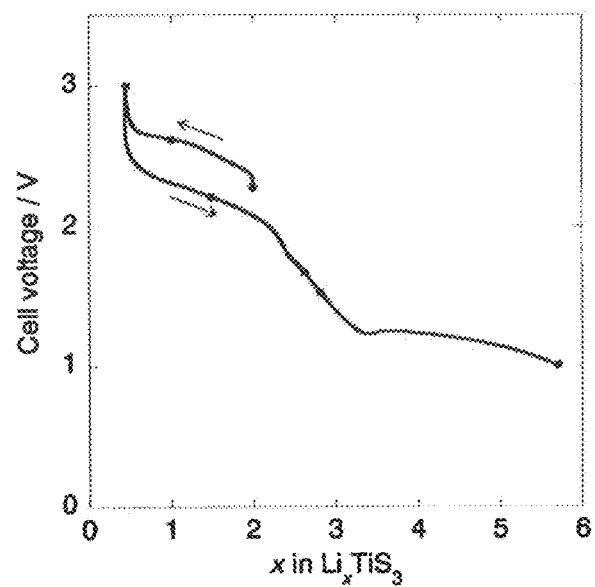
FIG. 5 shows charge-discharge curves showing the charge-discharge test results obtained in Test Example 2 with the x value of $Li_xTiS_3$ being plotted on the X-axis.
Figure 6:
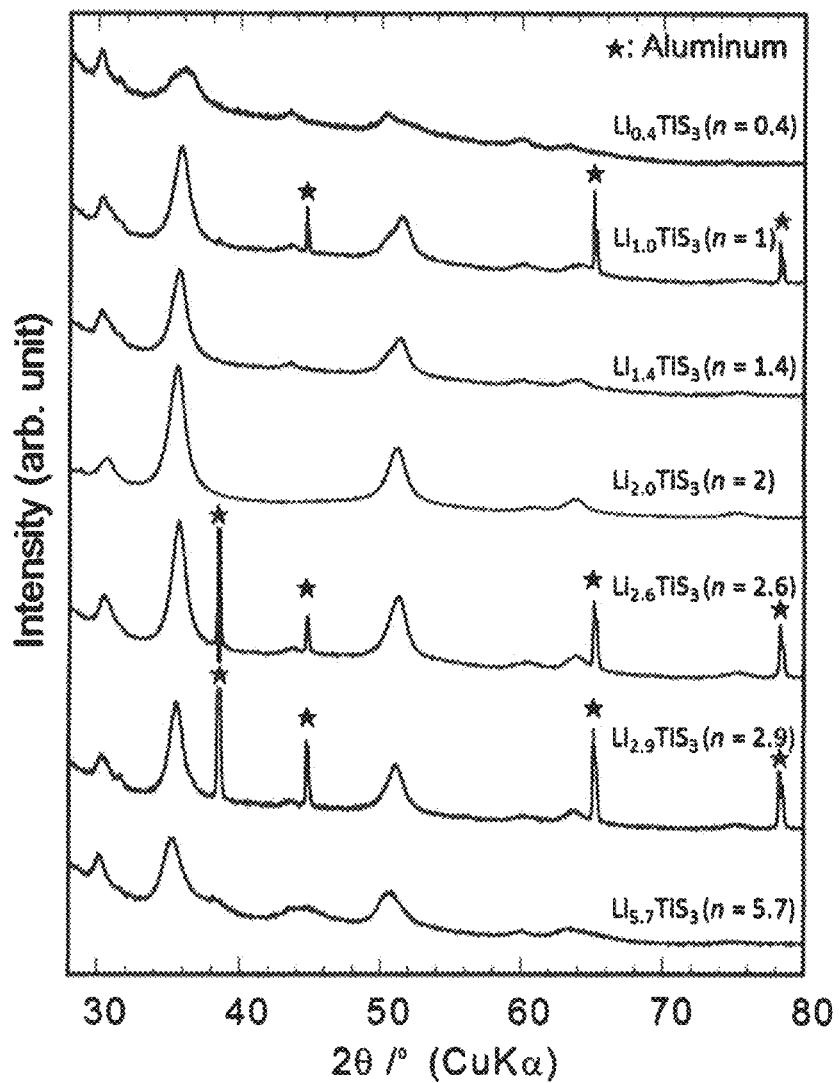
FIG. 6 is a graph showing the X-ray diffraction patterns of $Li_xTiS_3$ (04≤x≤5.7) powders obtained in Test Example 2.

FIG. 5 shows charge-discharge curves with the x value of Li$_x$TiS$_3$ being plotted on the X-axis.

In the charge-discharge test, when the lithium titanium sulfide of each composition had been produced, the charge-discharge test was discontinued, and the electrochemical cell was disassembled. The electrode comprising a complex of lithium titanium sulfide, acetylene black, and PTFE binder applied to an aluminum mesh was subjected to XRD measurement.

FIG. 5 shows the X-ray diffraction of each test sample obtained in this test. All the test samples were confirmed to have diffraction peaks at positions of 2θ=30.6°, 35.5°, 51.0°, 63.7°, and 75.0° with a tolerance of ±2°.

These results confirm that when lithium titanium sulfides represented by Li$_x$TiS$_3$ are electrochemically produced by using Li$_2$TiS$_3$ powder as a working electrode and x of Li$_x$TiS$_3$ is in the range of 0.4 to 5.7, all the resulting lithium titanium sulfides have a cubic rock salt crystal structure.

This result confirms that because lithium can be electrochemically intercalated into or removed from the Li$_2$TiS$_3$ powder obtained in Example 1 and Li$_x$TiS$_3$ (0.4≤x≤5.7), these compounds can be used as electrode active materials for lithium batteries and lithium secondary batteries.

Test Example 3: Charge-Discharge Test

An electrochemical cell was produced by the method below using the Li$_2$TiS$_3$ powder obtained in Example 1 above. Constant-current charge-discharge measurement was performed at a current density of 20 mA/g.

As a method for producing the electrochemical cell, first, a working electrode was produced in the following manner. Acetylene black and polytetrafluoroethylene (PTFE) as a binder were added to the Li$_2$TiS$_3$ powder obtained in Example 1 to a weight ratio of Li$_2$TiS$_3$ powder:acetylene black:PTFE 78:16:6. After kneading with a mortar for 15 minutes, the resulting mixture was applied to an aluminum mesh to form a working electrode. Polypropylene was used as a separator, and lithium was used as a counter electrode. As an electrolyte, a solution of 1M lithium bis(trifluoromethanesulfonyl)amide (LiTFSA) in a mixed solvent of 1,3-dioxolane (DOL) and 1,2-dimethoxyethane (DME) (1M LiTFSA DOL/DME) was used. Specifically, in this test example, ether was used as an electrolyte solvent.

Figure 7:
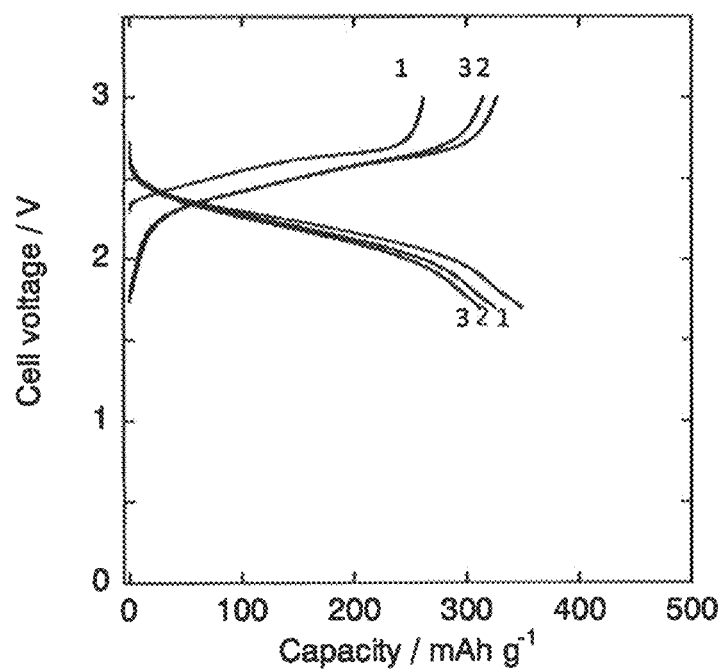
FIG. 7 shows charge-discharge curves showing the charge-discharge test results obtained in Test Example 3 using the $Li_2TiS_3$ powders obtained in Example 1.

FIG. 7 shows charge-discharge curves obtained by the constant-current charge-discharge measurement. The numerical values in FIG. 7 indicate the number of cycles. FIG. 7 confirms that in charge and discharge in the range of 1.7 to 3.0 V, an initial charge capacity of 270 mAh/g and an initial discharge capacity of 350 mAh/g were obtained per weight of Li$_2$TiS$_3$, and that Li$_2$TiS$_3$ allows for a large capacity of charge and discharge, compared to NbS$_2$ that has an initial discharge capacity of 170 mAh/g (according to a previous report) and TiS$_2$ that has an initial discharge capacity of 240 mAh/g (according to a previous report). FIG. 7 also confirms that Li$_2$TiS$_3$ allows repeated charge and discharge over the course of charge-discharge cycles and can be used as an electrode active material for lithium secondary batteries.

Test Example 4: X-ray Diffraction (No. 2)

Figure 8:
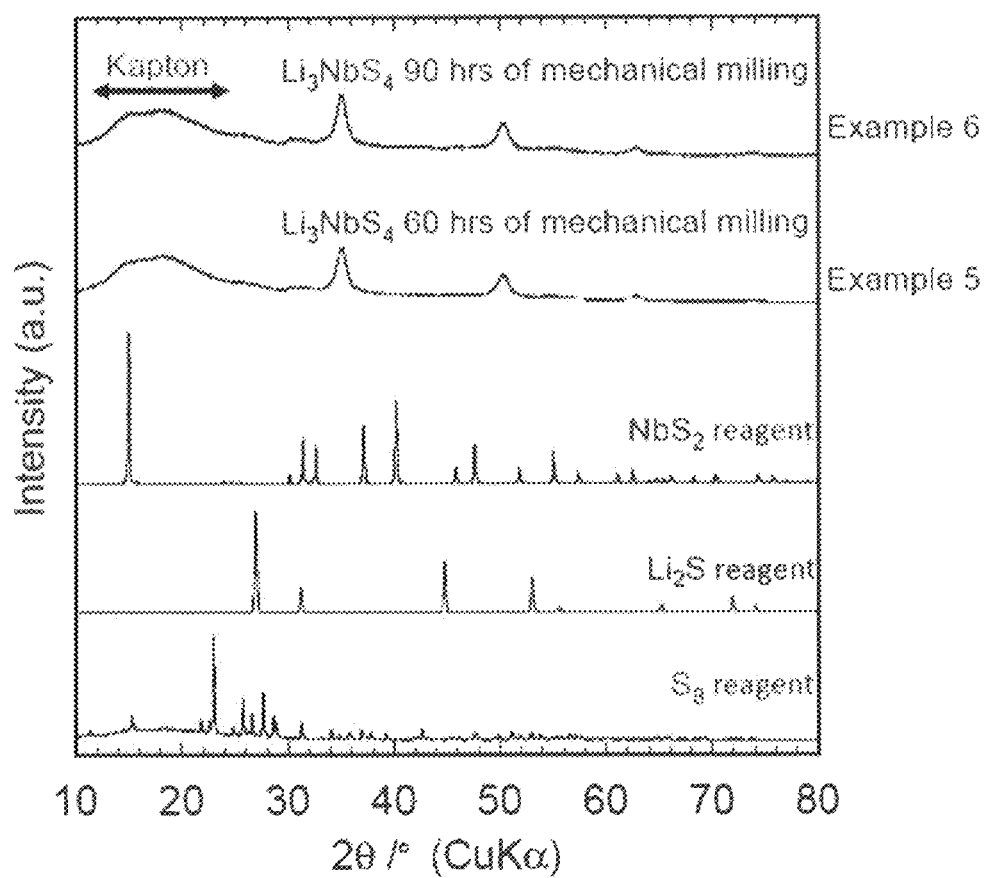
FIG. 8 is a graph showing X-ray diffraction patterns of the $Li_3NbS_4$ powders obtained in Examples 5 and 6.

The powders obtained in Examples 5 and 6 were subjected to X-ray diffraction (XRD) using Cu Kα radiation. FIG. 8 shows the results. For reference, FIG. 8 also shows the peaks of lithium sulfide (Li$_2$S) and niobium sulfide (NbS$_2$) used as starting materials. In the XRD measurement, a Kapton film was used to avoid exposing the obtained test samples to air. Therefore, the peak of Kapton is also observed at approximately 2θ=10 to 25°.

The X-ray diffraction diagram in FIG. 8 confirms that both of the samples obtained by 60 hours and 90 hours of mechanical milling have diffraction peaks at positions of 30.1°, 35.0°, 50.3°, 62.7°, and 73.9°.

Figure 9:
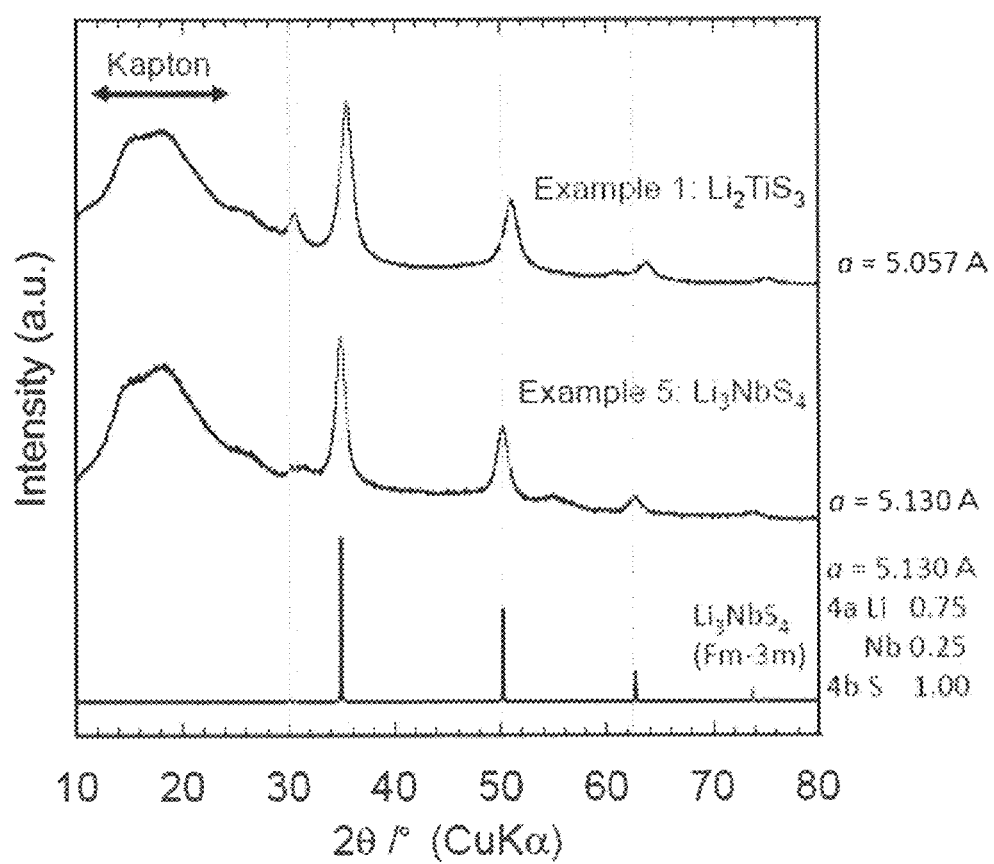
FIG. 9 is a graph showing X-ray diffraction patterns of the $Li_3NbS_4$ powder obtained in Example 5 and the $Li_2TiS_3$ powder obtained in Example 1.

Next, the powders obtained in Examples 1 and 5 were subjected to X-ray diffraction (XRD) using Cu Kα radiation. FIG. 9 shows the results. For reference, FIG. 9 also shows the peaks of $Li_3NbS_4$ simulated with a cubic rock salt crystal structure. In the XRD measurement, a Kapton film was used to avoid exposing the obtained test samples to air. Therefore, the peak of Kapton is also observed at approximately 2θ=10 to 25°.

The X-ray diffraction diagram in FIG. 9 confirms that the powder of Example 5 has diffraction peaks at positions of 2θ=30.1°, 35.0°, 50.3°, 62.7°, and 73.9°.

These peaks can be assigned to a space group:

$Fm\bar{3}m$ and can be attributed to a cubic rock salt crystal with a lattice constant of 5.130 Å. The obtained XRD profile was approximated very much to the pattern obtained by simulation results of a rock salt crystal structure model having a lattice constant of 5.130 Å and a Li:Ti:S ratio of 3:1:4. This result and the result of energy dispersion X-ray spectrometry show that the element ratio of niobium to sulfur is Nb:S=1:4, and that the obtained composition is hardly deviated from the feed composition. The element ratio of the powder obtained in Example 5 is thus considered to be Li:Nb:S=3:1:4.

The simulation results of the diffraction angle and intensity of the cubic rock salt crystal with a lattice constant of 5.130 Å are as follows.

TABLE 2

| h | k | l | 2θ/deg | d/Å | Intensity |
|---|---|---|--------|-----|-----------|
| 1 | 1 | 1 | 30.15 | 2.962 | 2.0 |
| 2 | 0 | 0 | 34.95 | 2.565 | 100 |
| 2 | 2 | 0 | 50.26 | 1.814 | 61 |
| 3 | 1 | 1 | 59.74 | 1.547 | 0.2 |
| 2 | 2 | 2 | 62.69 | 1.481 | 19 |
| 4 | 0 | 0 | 73.83 | 1.283 | 8.0 |
| 3 | 3 | 1 | 81.77 | 1.177 | 0.1 |
| 4 | 2 | 0 | 84.37 | 1.147 | 22 |
| 4 | 2 | 2 | 94.72 | 1.047 | 16 |

In contrast, as described above, the powder obtained in Example 1 has peaks at 30.6°, 35.5°, 51.0°, 63.7°, and 75.0°. The results show that the element ratio was Ti:S=1:3 and that the obtained composition is hardly deviated from the feed composition. The element ratio of the powder obtained in Example 1 is thus considered to be Li:Ti:S=2:1:3.

Test Example 5: Electrical Conductivity

A 100 mg quantity of each of the test sample powders obtained in Examples 1, 5, and 8 was placed in a tablet machine with a diameter of 10 mm, and uniaxially pressed at 25° C. and 360 MPa to obtain a sample for electrical conductivity measurement. Each sample was subjected to direct-current polarization measurement using a collector made of stainless steel to measure the electric resistance and calculate the electrical conductivity of the molded powder product.

Table 3 shows the results.

TABLE 3

| | Composition | Conductivity ($Scm^{-1}$) |
|---|---|---|
| Example 1 | $Li_2TiS_3$ | $8 \times 10^{-6}$ |
| Example 5 | $Li_3NbS_4$ | $2 \times 10^{-3}$ |
| Example 8 | $Li_{2.75}Ti_{0.25}Nb_{0.75}S_{3.75}$ | $6 \times 10^{-5}$ |

The results clearly indicate that the lithium titanium sulfide, lithium niobium sulfide, and lithium titanium niobium sulfide of the present invention have excellent electrical conductivity. The results show that compared to $Li_2S$, etc., the conductivity of which is difficult to measure due to resistance too high, the lithium titanium sulfide, lithium niobium sulfide, and lithium titanium niobium sulfide of the present invention have sufficient electrical conductivity. Among these, the lithium niobium sulfide and lithium titanium niobium sulfide of the present invention have much higher electrical conductivity than the lithium titanium sulfide of the present invention.

Test Example 6: X-ray Diffraction (No. 3)

Figure 10A:
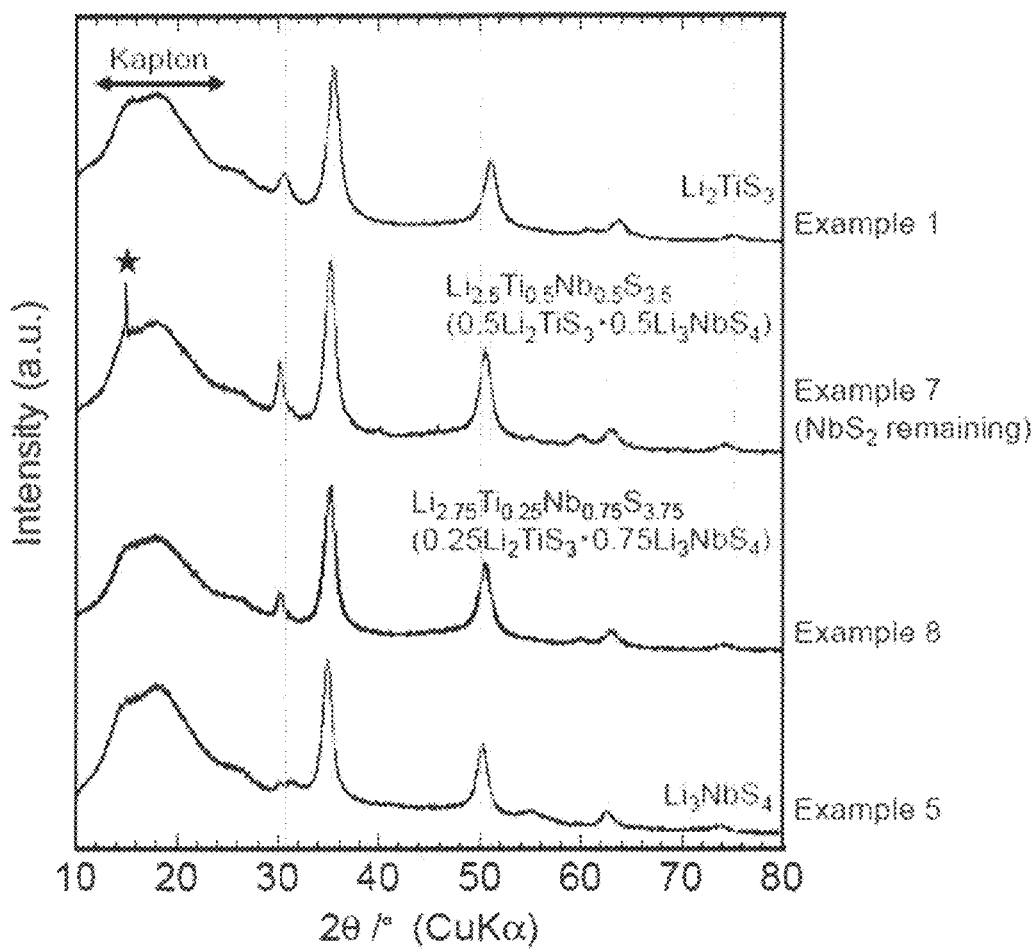
FIG. 10A is a graph (10 to 80°) showing X-ray diffraction patterns of the powders obtained in Examples 1, 5, 7, and 8. The peak of Kapton used to prevent air exposure is also detected.

The powders obtained in Examples 1, 5, 7 and 8 were subjected to X-ray diffraction (XRD) using Cu Kα radiation. FIGS. 10A and 10B show the results. In the XRD measurement, a Kapton film was used to avoid exposing the obtained test samples to air. Therefore, the peak of Kapton is also observed at approximately 2θ=10 to 25°.

The X-ray diffraction diagrams in FIGS. 10A and 10B confirm that all the samples obtained in Examples 5, 7, and 8 had diffraction peaks at positions of 30.1°, 35.0°, 50.3°, 62.7°, and 73.9° within a tolerance of ±2°. The peak of $NbS_2$ used as a starting material is also detected from the sample obtained in Example 7. The sample is thus considered to contain the starting material $NbS_7$ as an impurity in an amount of 2 wt % or less.

As in Test Example 4, the results of energy dispersion type X-ray spectrometry show that the element ratio of Example 7 is Ti:Nb:S=1:1:7, and the element ratio of Example 8 is Ti:Nb:S=1:3:15. The composition of each sample obtained by this method was thus found to be hardly deviated from the feed composition. Accordingly, the element ratio of the sample obtained in Example 7 is considered to be Li:Ti:Nb:S=5:1:1:7. The element ratio of the sample obtained in Example 8 is considered to be Li:TiNb:S=11:1:3:15.

Test Example 7: Charge-Discharge Test

Electrochemical cells were produced by the method below using the $Li_2TiS_3$ powder obtained in Example 1 and the $Li_3NbS_4$ powder obtained in Example 5. Constant-current charge-discharge measurement was performed at a current density of 20 mA/g.

As a method for producing the electrochemical cells, first, working electrodes were produced in the following manner. Acetylene black and polytetrafluoroethylene (PTFE) as a binder were added to the $Li_2TiS_3$ powder obtained in Example 1 and to $Li_3NbS_4$ powder obtained in Example 5 to a weight ratio of and $Li_3NbS_4$ powder:acetylene black:PTFE=86:8:6. After kneading with a mortar for 15 minutes, the resulting mixture was applied to an aluminum mesh to form a working electrode. Polypropylene was used as a separator, and lithium was used as a counter electrode. As an electrolyte, a solution of 1M lithium hexafluorophosphate ($LiPF_6$) in a mixed solvent of ethylene carbonate (EC) and dimethyl carbonate (DMC) at a weight ratio 1:1 (1M LiTFSA DOL/DME) was used. In this test example, a carbonate was used as an electrolyte solvent.

Figure 11:
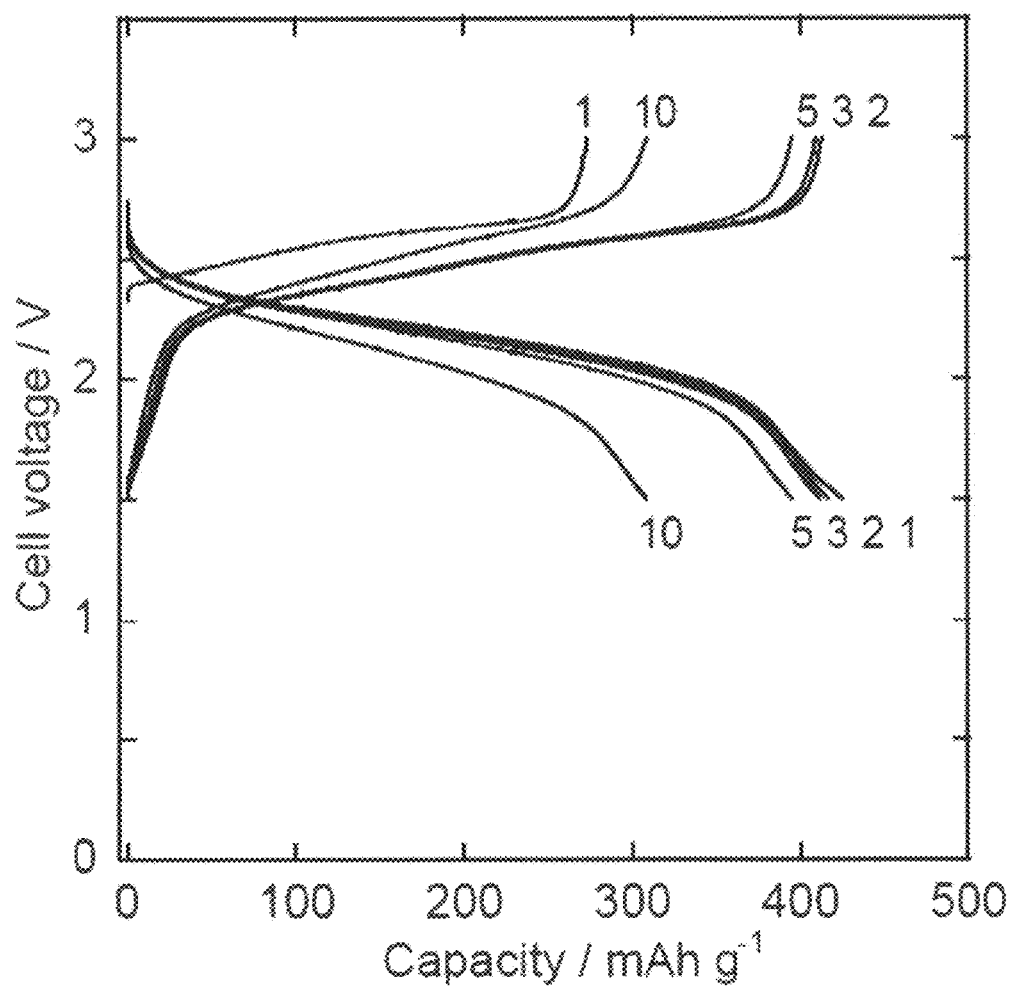
FIG. 11 shows charge-discharge curves showing the charge-discharge test results obtained in Test Example 7 using the $Li_2TiS_3$ powder obtained in Example 1. (The electrolyte is different from the one used in Test Example 3.)
Figure 12:
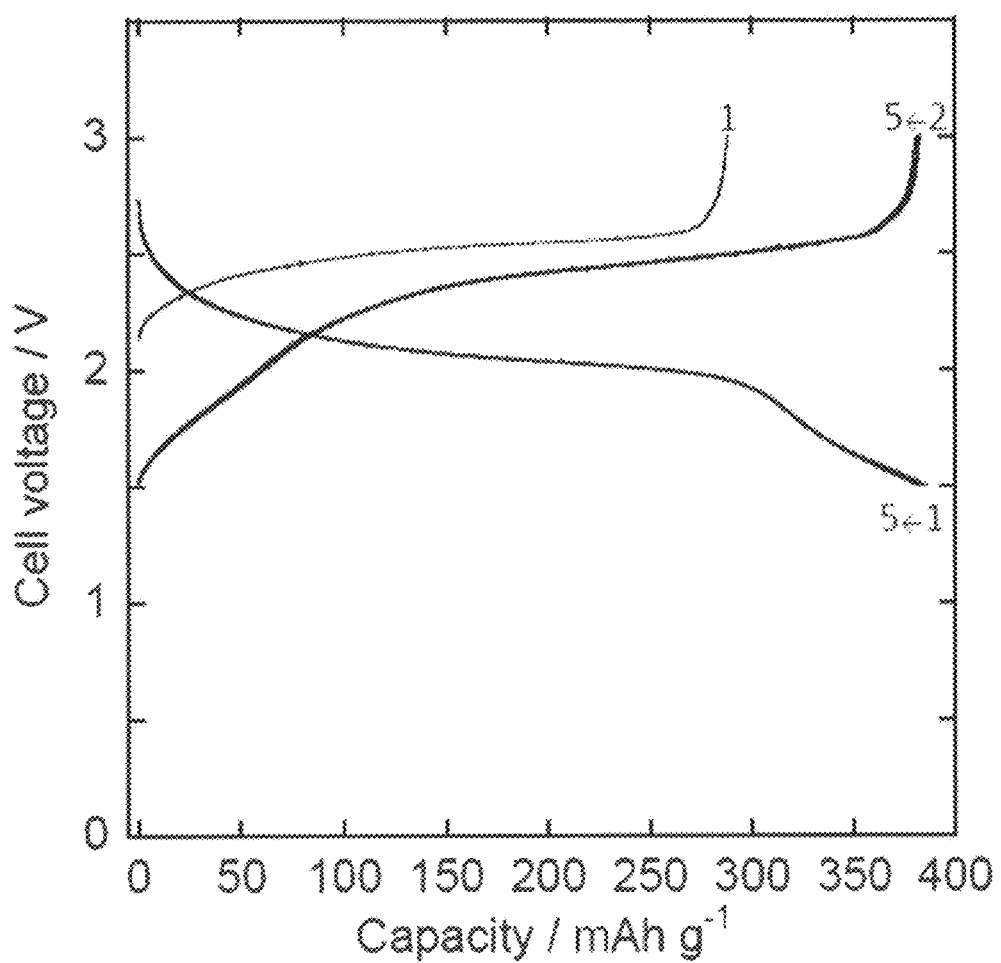
FIG. 12 shows charge-discharge curves showing the charge-discharge test results obtained using the $Li_3NbS_4$ powder obtained in Example 5.

FIGS. 11 and 12 show charge-discharge curves obtained by subjecting the $Li_2TiS_3$ powder obtained in Example 1 and the $Li_3NbS_4$ powder obtained in Example 5 to 10 cycles and 5 cycles of the constant-current charge-discharge measurement, respectively using the electrochemical cells described above. FIGS. 11 and 12 show the results of electrochemical cells that are the same in terms of experimental method, etc., but are not of completely identical construction. The numerical values in FIGS. 11 and 12 indicate the number of cycles.

FIG. 11 shows that that when the $Li_2TiS_3$ powder obtained in Example 1 was used, an initial charge capacity of 273 mAh/g and an initial discharge capacity of 425 mAh/g were obtained per weight of $Li_2TiS_3$ in charge and discharge at a voltage in the range of 1.5 to 3 V, even when an electrolyte containing a carbonate solvent was used, as well as when an electrolyte containing the ether solvent in Test Example 3 was used. Further, FIG. 12 shows that that when the $Li_3NbS_4$ powder obtained in Example 5 was used, an initial charge capacity of 288 mAh/g and an initial discharge capacity of 387 mAh/g were obtained per weight of $Li_3NbS_4$ in charge and discharge at a voltage in the range of 1.5 to 3 V. Any of the $Li_2TiS_3$ and $Li_3NbS_4$ powders allows for a large amount of charge and discharge, compared to $NbS_2$ that has an initial discharge capacity of 170 mAh/g (according to a previous report) and $TiS_2$ that has an initial discharge capacity of 240 mAh/g (according to a previous report). The results confirm that any of the $Li_2TiS_3$ and $Li_3NbS_4$ powders allows repeated charge and discharge over the course of charge-discharge cycles, and can be used as an electrode active material for lithium batteries, such as lithium secondary batteries.

Figure 13:
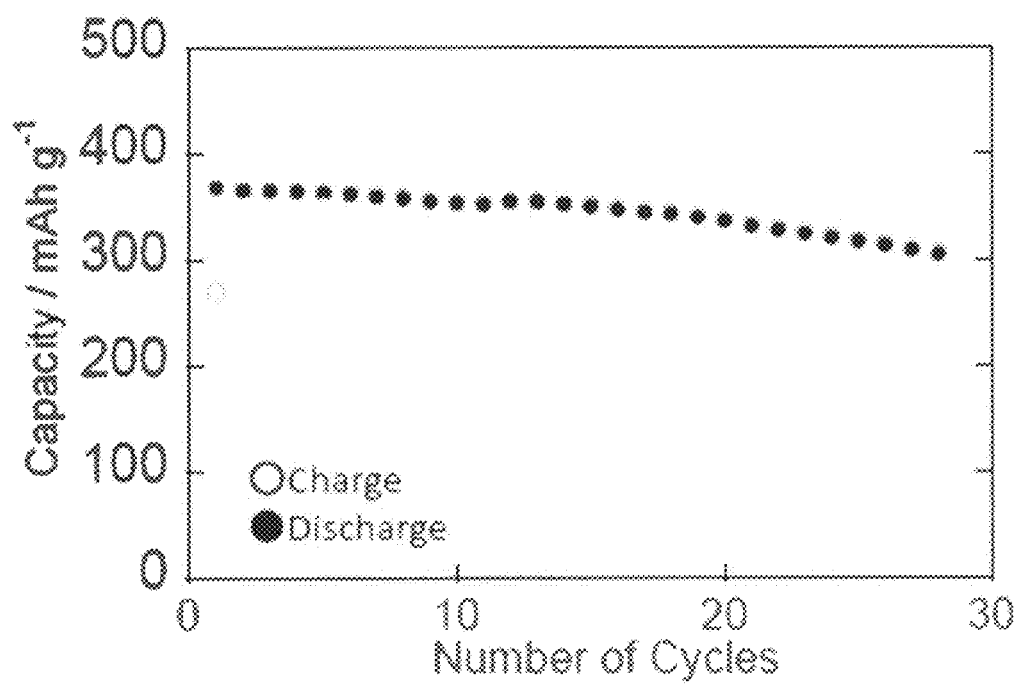
FIG. 13 is a graph showing the charge-discharge test results (cycle characteristics) obtained using the $Li_3NbS_4$ powder obtained in Example 5.

FIG. 13 shows the charge-discharge capacity determined by 20 cycles of the constant-current charge-discharge measurement using the electrochemical cell comprising the $Li_3NbS_4$ powder obtained in Example 5. The results show that excellent cycle characteristics were obtained in both charge and discharge. The results indicate that charge and discharge characteristics that allow for 100 cycles or more can be fully expected.

Figure 14:
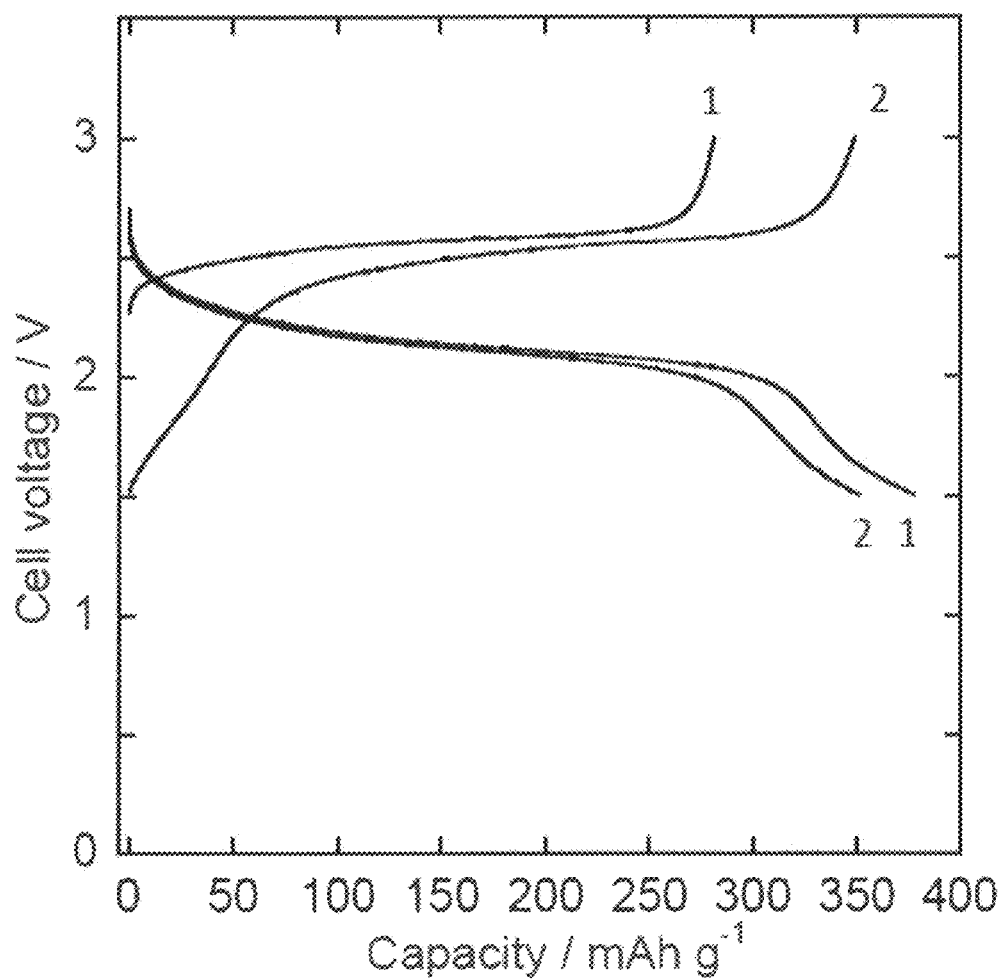
FIG. 14 shows charge-discharge curves showing the charge-discharge test results obtained using the $Li_{2.5}Ti_{0.5}Nb_{0.5}S_{3.5}$ powder obtained in Example 7.

Using the $Li_{2.5}Ti_{0.5}Nb_{0.5}S_{3.5}$ powder obtained in Example 7, an electrochemical cell was produced in the same manner as above. Two cycles of constant-current charge-discharge measurement were performed at a current density of 20 mA/g. FIG. 14 shows the results.

Figure 15:
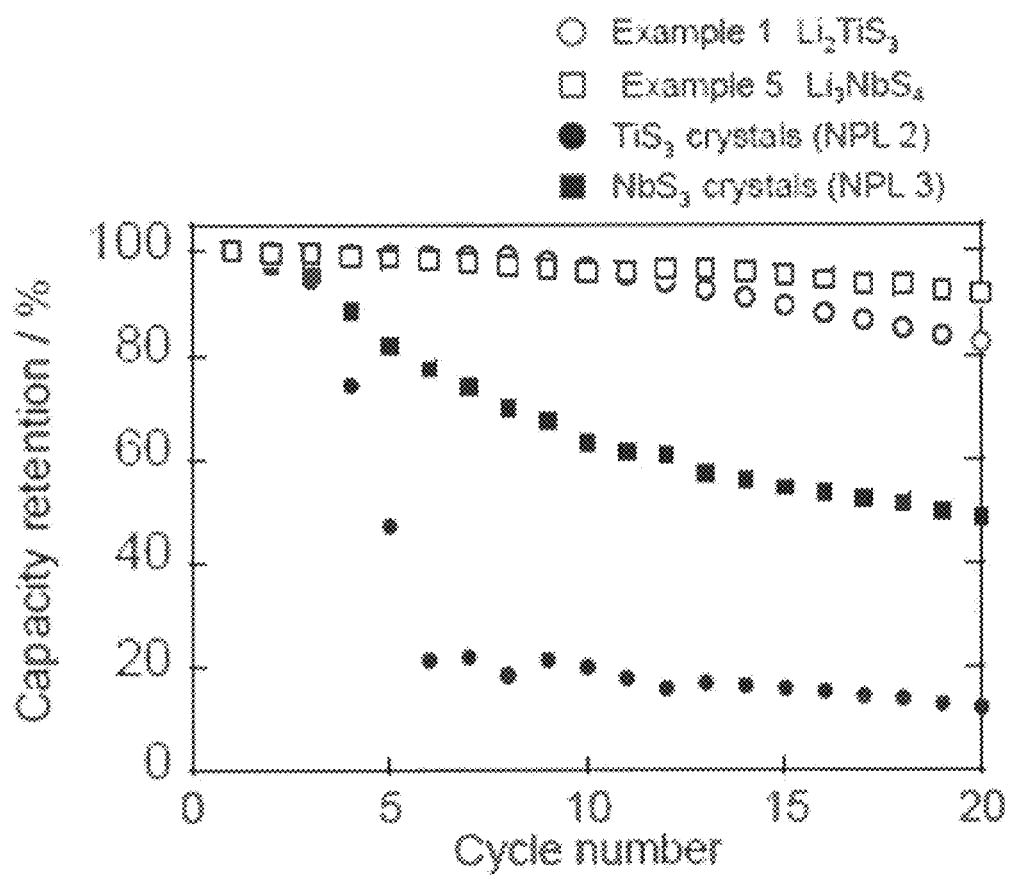
FIG. 15 shows a graph showing the charge-discharge test results (cycle characteristics) obtained using the $Li_3NbS_4$ powder obtained in Example 5 and the $Li_2TiS_3$ powder obtained in Example 1.
Figure 16:
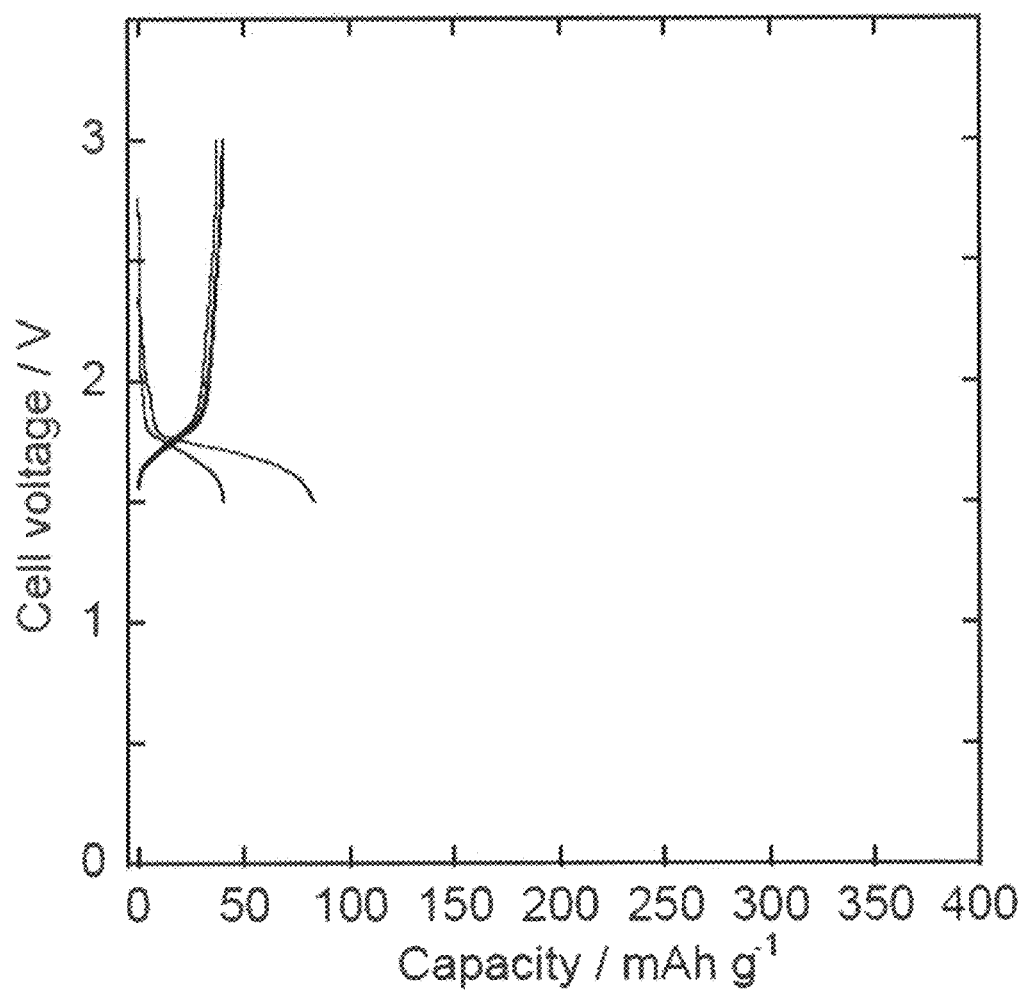
FIG. 16 shows charge-discharge curves showing the charge-discharge test results obtained using niobium sulfide ($NbS_2$) powder.

Electrochemical cells were produced in the same manner as above using the $Li_2TiS_3$ powder obtained in Example 1 and the $Li_3NbS_4$ powder obtained in Example 5. FIG. 15 shows the charge-discharge capacity determined by 20 cycles of constant-current charge-discharge measurement. FIG. 15 shows the capacity retention rate of $TiS_3$ crystals readable from NFL 2 and the capacity retention rate of $NbS_3$ crystals readable from NFL 3. The results show that both the $Li_2TiS_3$ powder obtained in Example 1 and the $Li_3NbS_4$ powder obtained in Example 5 were able to remarkably enhance cycle characteristics, compared to the sulfides previously reported. The powder of Example 5 achieved better cycle characteristics than the powder of Example 1. In this Test Example, all the electrochemical cells were produced using a carbonate solvent.

Figure 17:
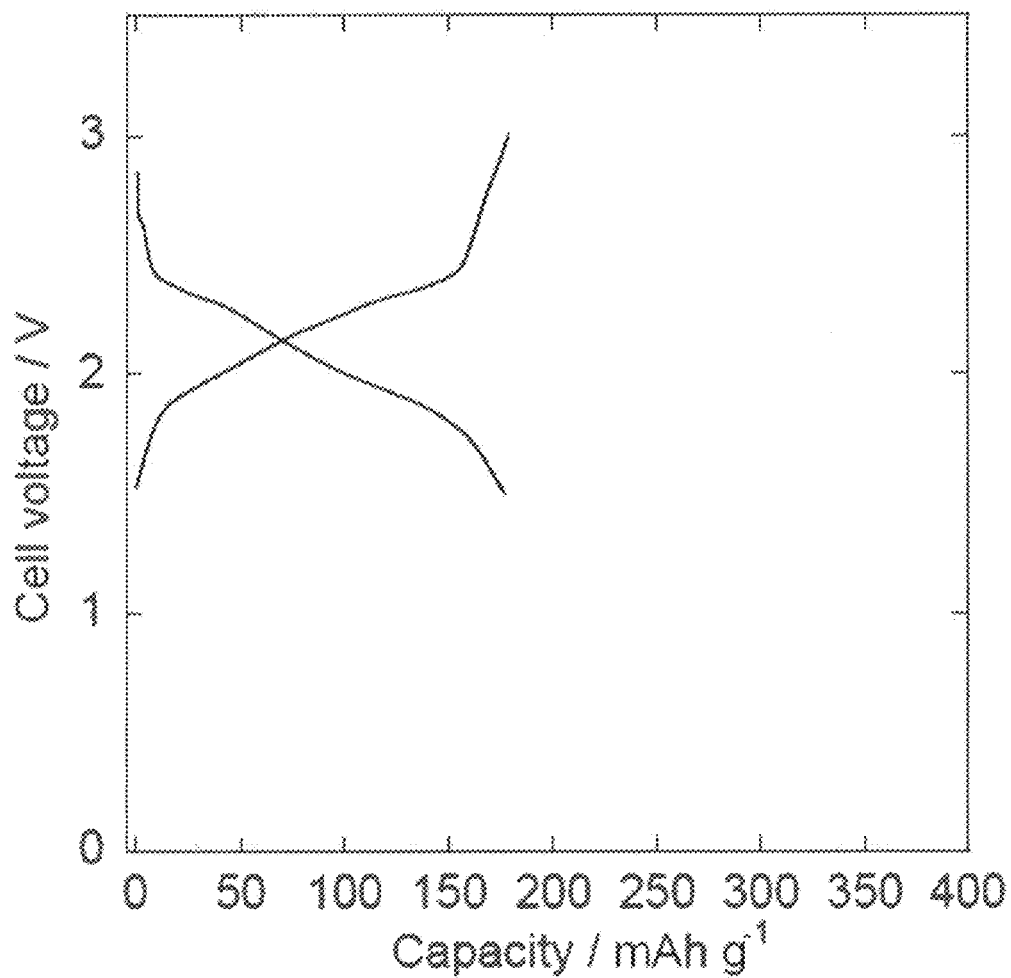
FIG. 17 shows charge-discharge curves showing the charge-discharge test results obtained using titanium sulfide ($TiS_2$) powder.

For reference, FIGS. 15 and 17 show charge-discharge curves obtained by subjecting niobium sulfide ($NbS_2$) powder and titanium sulfide ($TiS_2$) powder used as starting materials in the above Examples to constant-current charge-discharge measurement in the same manner.

Figure 18:
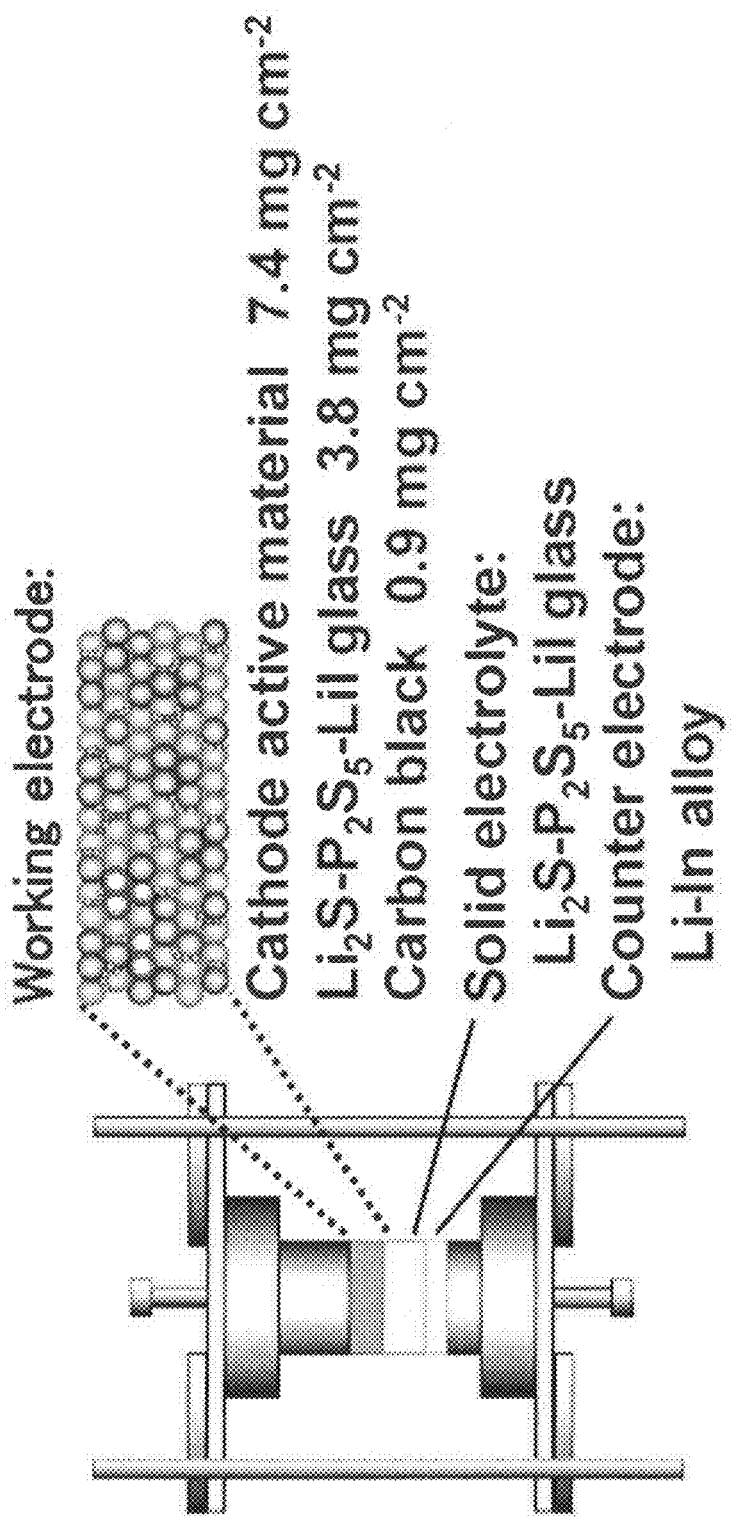
FIG. 18 is a schematic diagram illustrating an all-solid solid lithium secondary battery produced in Test Example 8.

Test Example 8: Operating Characteristics of all-Solid Lithium Secondary Battery All-solid lithium secondary batteries for testing were produced by the following method using the $Li_2TiS_3$ powder obtained in Example 1 and the $Li_3NbS_4$ powder obtained in Example 5 as cathode active materials. A charge-discharge test was performed with constant-current measurement starting from charge. FIG. 18 shows a schematic diagram of one of the obtained all-solid lithium secondary batteries for testing. FIG. 18 shows the battery comprising $Li_2TiS_3$ as a cathode active material.

Figure 19:
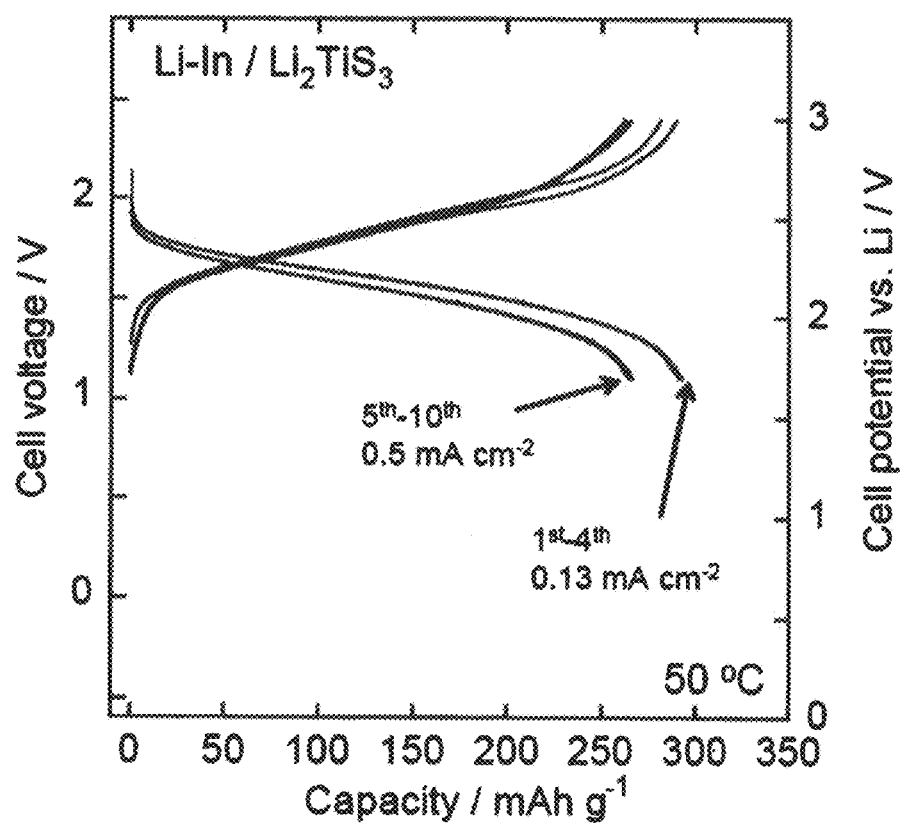
FIG. 19 is a graph showing the operational characteristic test (charge-discharge test) results obtained using Li$_2$TiS$_3$ powder obtained in Example 1.
Figure 20:
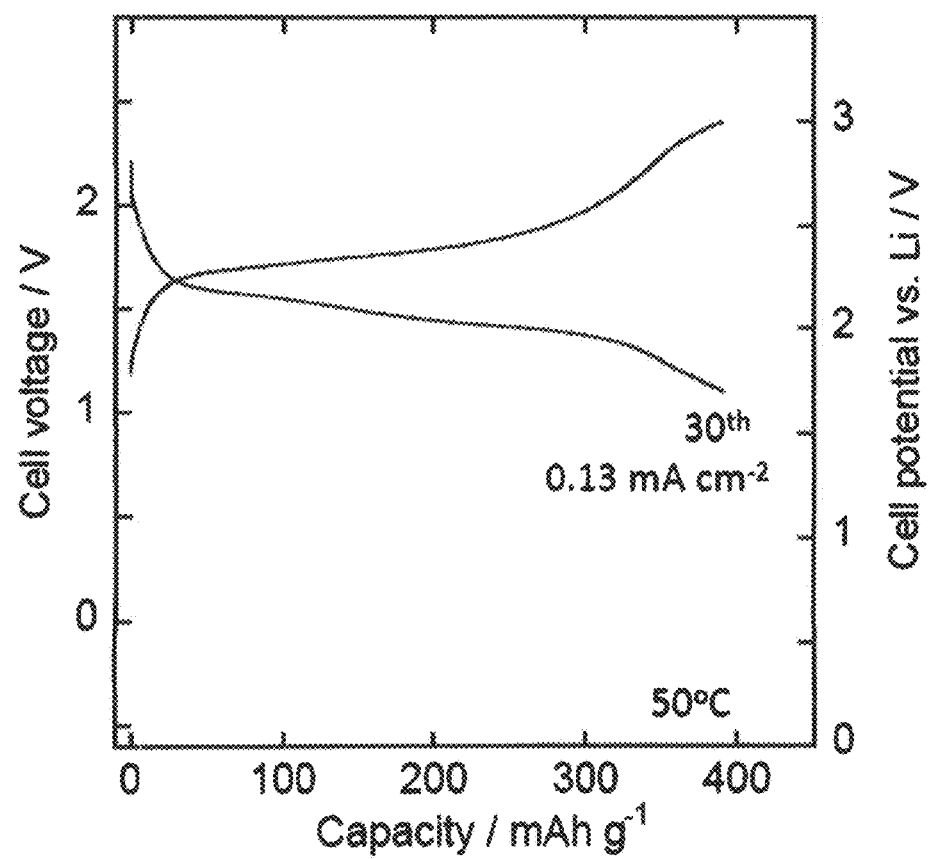
FIG. 20 is a graph showing the operational characteristic test (charge-discharge test) results obtained using Li$_3$NbS$_1$ powder obtained in Example 5.

The all-solid lithium secondary batteries for testing were produced in the following manner. First, as a cathode material, the fine powder (cathode active material) obtained in Example 1 or 5, carbon black, and sulfide solid electrolyte ($Li_2S$—$P_2S_5$—LiI glass) were weighed to a ratio (by weight) of cathode active material:carbon black:sulfide solid electrolyte=62:7:31, and kneaded with a mortar for 5 minutes. After 10 mg of the obtained mixture was homogeneously placed in a molding device with a diameter of 10 mm, 80 mg of a sulfide solid electrolyte ($Li_2S$—$P_2S$—LiI glass) was layered on the mixture, and the resulting product was uniaxially molded at 370 MPa. Then, as an anode, 0.3-mm-thick indium foil and 0.2-mm-thick lithium foil were laminated onto the side of sulfide solid electrolyte ($Li_2S$—$P_2S_5$—LiI glass). The resulting product was then uniaxially molded at 120 MPa to obtain an all-solid lithium secondary battery for testing. For both the cathode and anode, stainless steel was used as a collector. The charge-discharge test was conducted in a 50° C. thermostat bath after pre-cycling at 30° C. FIGS. 19 to 20 show the results of the charge-discharge test.

Figure 21:
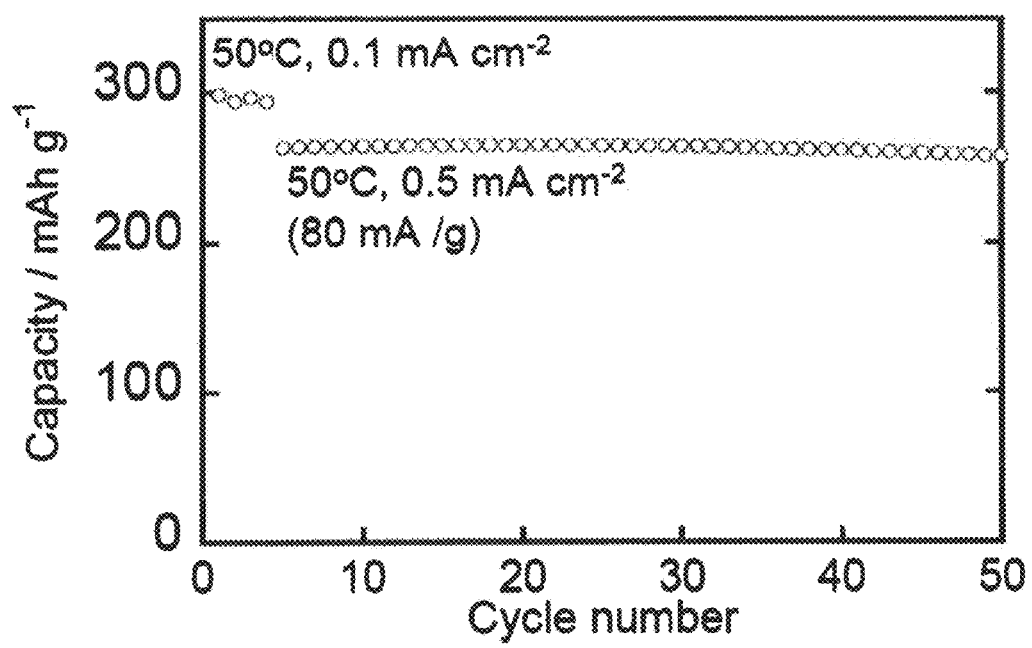
FIG. 21 is a graph showing the operational characteristic test (cycle characteristic) results obtained using Li$_2$TiS$_3$ powder obtained in Example 1.

Using the $Li_2TiS_3$ powder obtained in Example 1, an all-solid lithium secondary battery was produced in the same manner as above. For the first to forth cycles, the battery was charged and discharged at a constant-current of 0.1 mA/cm$_2$ at 50° C. For the 5th to 50th cycles, the battery was charged and discharged at a constant-current of 0.5 mA/cm$_2$ (80 mA/g) at 50° C. FIG. 21 shows the results of charge-discharge capacity (results of cycle characteristics) determined by 50 cycles of constant-current charge-discharge measurement.

The above results show that all-solid lithium secondary batteries produced by using the $Li_2TiS_3$ powder obtained in Example 1 or the $Li_2NbS_4$ powder obtained in Example 5 as a cathode active material were able to be operated.

We claim:
1. A sulfide comprising lithium, titanium and/or niobium, and sulfur as constituent elements, wherein the sulfide is characterized by any one of the following (1) to (3):
   (1) a lithium titanium sulfide comprising lithium, titanium, and sulfur as constituent elements, wherein the lithium titanium sulfide has a cubic rock salt crystal structure and comprises lithium and titanium ions that randomly occupy cationic sites;
   (2) a lithium niobium sulfide comprising lithium, niobium, and sulfur as constituent elements and having diffraction peaks at positions of at least 35.0°, 50.3°, and 62.7° in the diffraction angle range of 2θ=10° to 80° with a tolerance of ±2° in an X-ray diffractogram obtained using Cu Kα radiation; and
   (3) a lithium titanium niobium sulfide comprising lithium, titanium, niobium, and sulfur as constituent elements and having diffraction peaks at positions of at least 30.5°, 35.3°, 50.6°, and 63.2° in the diffraction angle range of 2θ=10° to 80° with a tolerance of ±2° in an X-ray diffractogram obtained using Cu Kα radiation.

2. The sulfide according to claim 1, wherein the lithium titanium sulfide of (1) is represented by $Li_{n1}TiS_{m1}$, wherein 0.4≤n1≤6 and 2≤m1≤5.

3. The sulfide according to claim 1, wherein the lithium titanium sulfide of (1) has diffraction peaks at positions of at least 30.6°, 35.5°, 51.0°, 60.6°, and 63.7° in the diffraction angle range of 2θ=10° to 80° with a tolerance of ±2° in an X-ray diffractogram obtained using Cu Kα radiation.

4. A method for producing the sulfide according to claim 1, which is the lithium titanium sulfide of (1), comprising a step of subjecting lithium sulfide, titanium sulfide, and optionally sulfur, to mechanical milling as starting materials.

5. The sulfide according to claim 1, wherein the composition ratio of sulfur S to niobium Nb, S/Nb, of the lithium niobium sulfide of (2) is in the range of 2 to 6 in terms of the molar ratio.

6. The sulfide according to claim 1, wherein the composition ratio of lithium Li to niobium Nb, Li/Nb, of the lithium niobium sulfide of (2) is in the range of 1 to 5 in terms of the molar ratio.

7. The sulfide according to claim 1, wherein the lithium niobium sulfide of (2) has a cubic crystal structure.

8. The sulfide according to claim 1, wherein the lithium niobium sulfide of (2) has a diffraction peak at a position of 73.9° in the diffraction angle range of 2θ=10° to 80° with a tolerance of ±2° in an X-ray diffractogram obtained using Cu Kα radiation.

9. A method for producing the sulfide according to claim 1, is the lithium niobium sulfide of (2) comprising a step of subjecting lithium sulfide, niobium sulfide, and optionally sulfur, to mechanical milling as starting materials.

10. The sulfide according to claim 1, wherein the composition ratio of sulfur S to the sum of titanium Ti and niobium Nb, S/(Ti+Nb), of the lithium titanium niobium sulfide of (3) is in the range of 2 to 6 in terms of the molar ratio.

11. The sulfide according to claim 1, wherein the composition ratio of lithium Li to the sum of titanium Ti and niobium Nb, Li/(Ti+Nb), of the lithium titanium niobium sulfide of (3) is in the range of 0.4 to 6 in terms of the molar ratio.

12. The sulfide according to claim 1, wherein the lithium titanium niobium sulfide of (3) has a cubic crystal structure.

13. A method for producing the sulfide according to claim 1, which is the lithium titanium niobium sulfide of (3) comprising subjecting lithium sulfide, titanium sulfide, niobium sulfide, and optionally sulfur, to mechanical milling as starting materials.

14. A charge and discharge product of the sulfide according to claim 1.

15. An electrode for lithium batteries comprising, as an electrode active material, the sulfide according to claim 1.

16. The electrode for lithium batteries according to claim 15, which is a cathode for lithium batteries.

17. A lithium battery comprising the electrode for lithium batteries according to claim 15.

18. The lithium battery according to claim 17, further comprising a non-aqueous electrolyte comprising a carbonate-containing solvent.

19. The lithium battery according to claim 18, wherein the carbonate content of the solvent in the non-aqueous electrolyte is 1 to 100 volume %.

* * * * *